United States Patent
Ball et al.

(10) Patent No.: US 10,433,108 B2
(45) Date of Patent: Oct. 1, 2019

(54) PROACTIVE DOWNLOADING OF MAPS

(71) Applicant: Apple Inc., Cupertino, CA (US)

(72) Inventors: Matthew B. Ball, Pacifica, CA (US); Brian J. Andrich, San Francisco, CA (US); Jonathan Paul McCabe, San Jose, CA (US); Julie M. Fortuna, Mountain View, CA (US); Joseph A. Dean, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/990,412

(22) Filed: May 25, 2018

(65) Prior Publication Data

US 2018/0352374 A1    Dec. 6, 2018

Related U.S. Application Data

(63) Continuation of application No. 62/514,573, filed on Jun. 2, 2017.

(51) Int. Cl.
| | |
|---|---|
| *H04W 4/021* | (2018.01) |
| *H04L 29/08* | (2006.01) |
| *G06F 16/29* | (2019.01) |
| *G06F 16/23* | (2019.01) |
| *G06F 16/9537* | (2019.01) |

(Continued)

(52) U.S. Cl.
CPC ........ *H04W 4/021* (2013.01); *G06F 16/2379* (2019.01); *G06F 16/24578* (2019.01); *G06F 16/29* (2019.01); *G06F 16/9537* (2019.01); *H04L 67/06* (2013.01); *H04W 4/02* (2013.01); *H04W 84/12* (2013.01)

(58) Field of Classification Search
CPC ......... H04W 4/02; H04W 4/021; H04W 4/04; H04W 24/08; H04W 84/12; H04W 4/21; H04W 4/30; H04W 4/80; H04W 4/12; H04L 67/18; H04L 67/306; H04L 67/06; G01C 21/005; G01C 21/3614; G01C 21/3667; G01C 21/367; G01C 21/32; G01S 19/42; G01S 9/42; H04M 1/72572; H04M 2250/10; G06F 16/2379; G06F 16/9537; G06F 16/24578; G06F 16/29; G06F 17/30241; G06F 17/30377; G06F 17/3053; G06F 17/3087
See application file for complete search history.

(56) References Cited

U.S. PATENT DOCUMENTS 9,031,783 B2   5/2015   Bells
9,361,322 B1   6/2016   Dutta et al.
(Continued)

*Primary Examiner* — Christopher M Brandt
*Assistant Examiner* — Jing Gao
(74) *Attorney, Agent, or Firm* — Invoke

(57) ABSTRACT

In some implementations, a computing device can identify relevant locations using location data gathered by and/or entered into the device. In some implementations, the device can proactively request offline map data for the relevant locations. A server can identify offline map data responsive to the request and send at least a portion thereof to the device in response. In some implementations, the device can suggest downloading offline map data for the relevant locations to a user before requesting the data. The user may be able to edit the location and/or search for other locations to download. The device may provide features for managing downloaded offline map content automatically and/or in response to user input.

24 Claims, 31 Drawing Sheets

(51) Int. Cl.
*G06F 16/2457* (2019.01)
*H04W 4/02* (2018.01)
*H04W 84/12* (2009.01)

(56) References Cited

U.S. PATENT DOCUMENTS

| | | |
|---|---|---|
| 2008/0122796 A1 | 5/2008 | Jobs et al. |
| 2009/0100018 A1 | 4/2009 | Roberts |
| 2009/0177399 A1 | 7/2009 | Park et al. |
| 2011/0193795 A1 | 8/2011 | Seidman et al. |
| 2013/0260727 A1 | 10/2013 | Knudson et al. |
| 2014/0033322 A1 | 1/2014 | Nair et al. |
| 2014/0066106 A1 | 3/2014 | Ngo et al. |
| 2014/0123247 A1 | 5/2014 | Abhyanker |
| 2014/0244165 A1 | 8/2014 | Bells |
| 2014/0279013 A1 | 9/2014 | Chelly et al. |
| 2014/0361983 A1 | 12/2014 | Dolfing et al. |
| 2014/0363074 A1 | 12/2014 | Dolfing et al. |
| 2015/0358577 A1 | 12/2015 | Zhou et al. |
| 2015/0358580 A1 | 12/2015 | Zhou et al. |
| 2015/0358582 A1 | 12/2015 | Zhou et al. |
| 2015/0369617 A1* | 12/2015 | Ding .................. G01C 21/34 701/428 |
| 2016/0066149 A1 | 3/2016 | Pahwa et al. |
| 2017/0325064 A1* | 11/2017 | Kernan ................ H04W 4/029 |
| 2018/0253445 A1* | 9/2018 | Ni ..................... G06F 17/30241 |

\* cited by examiner

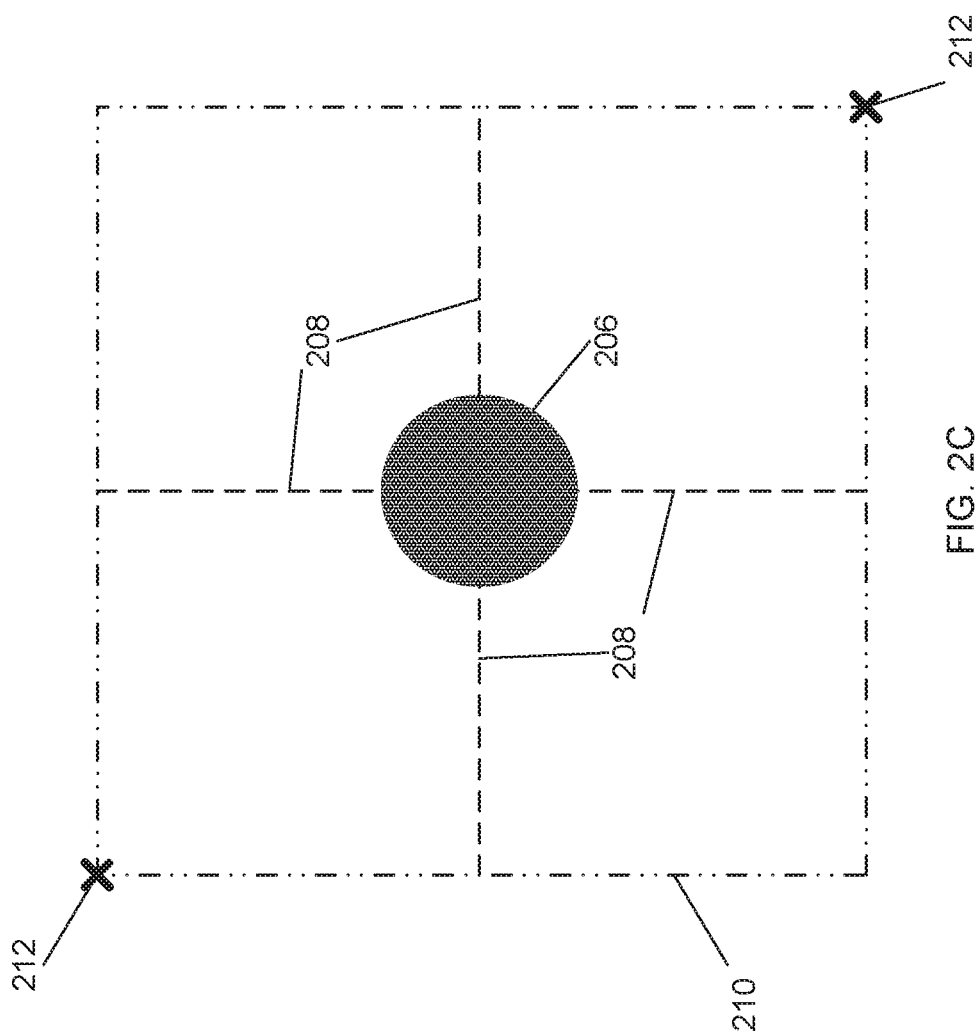

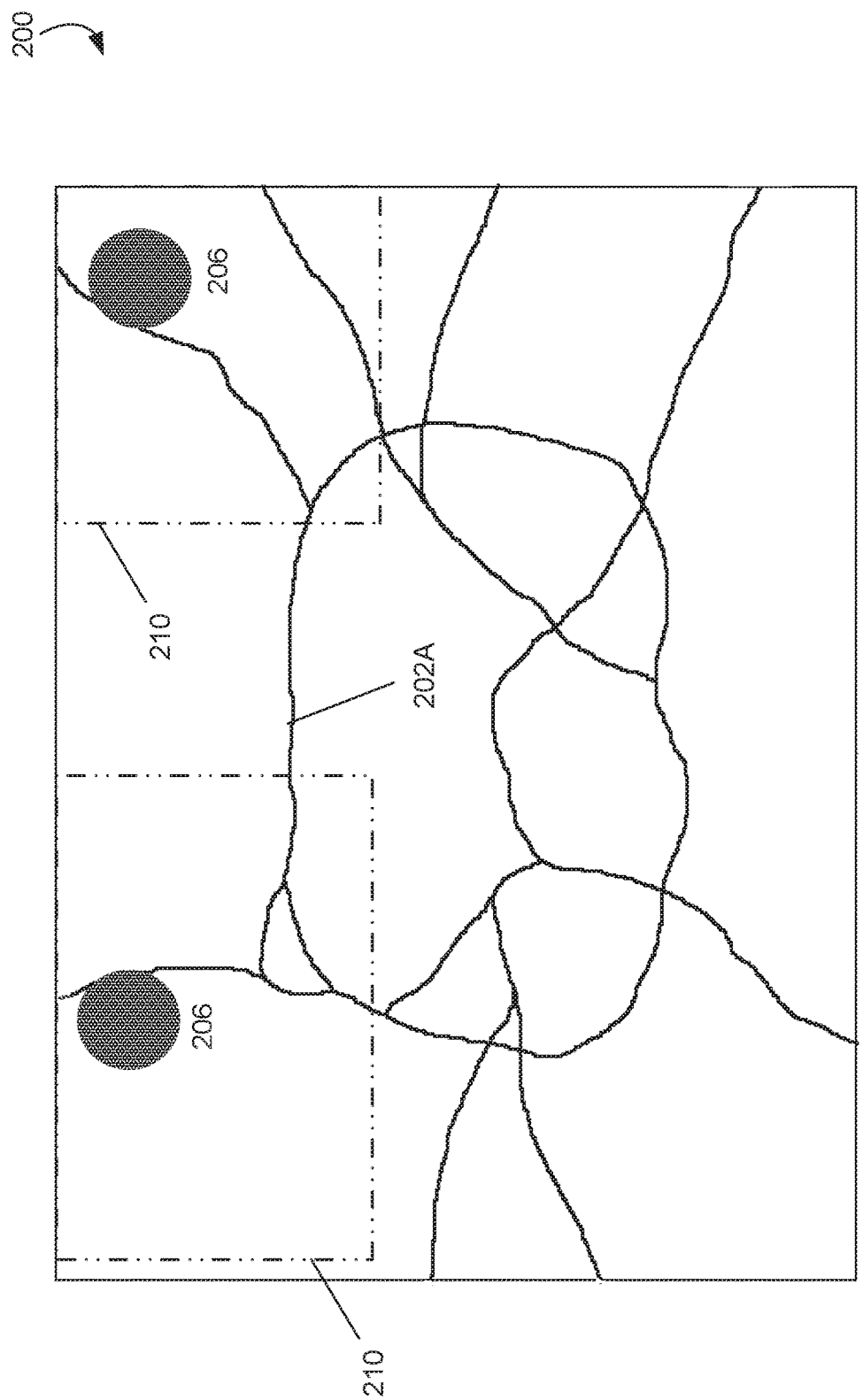

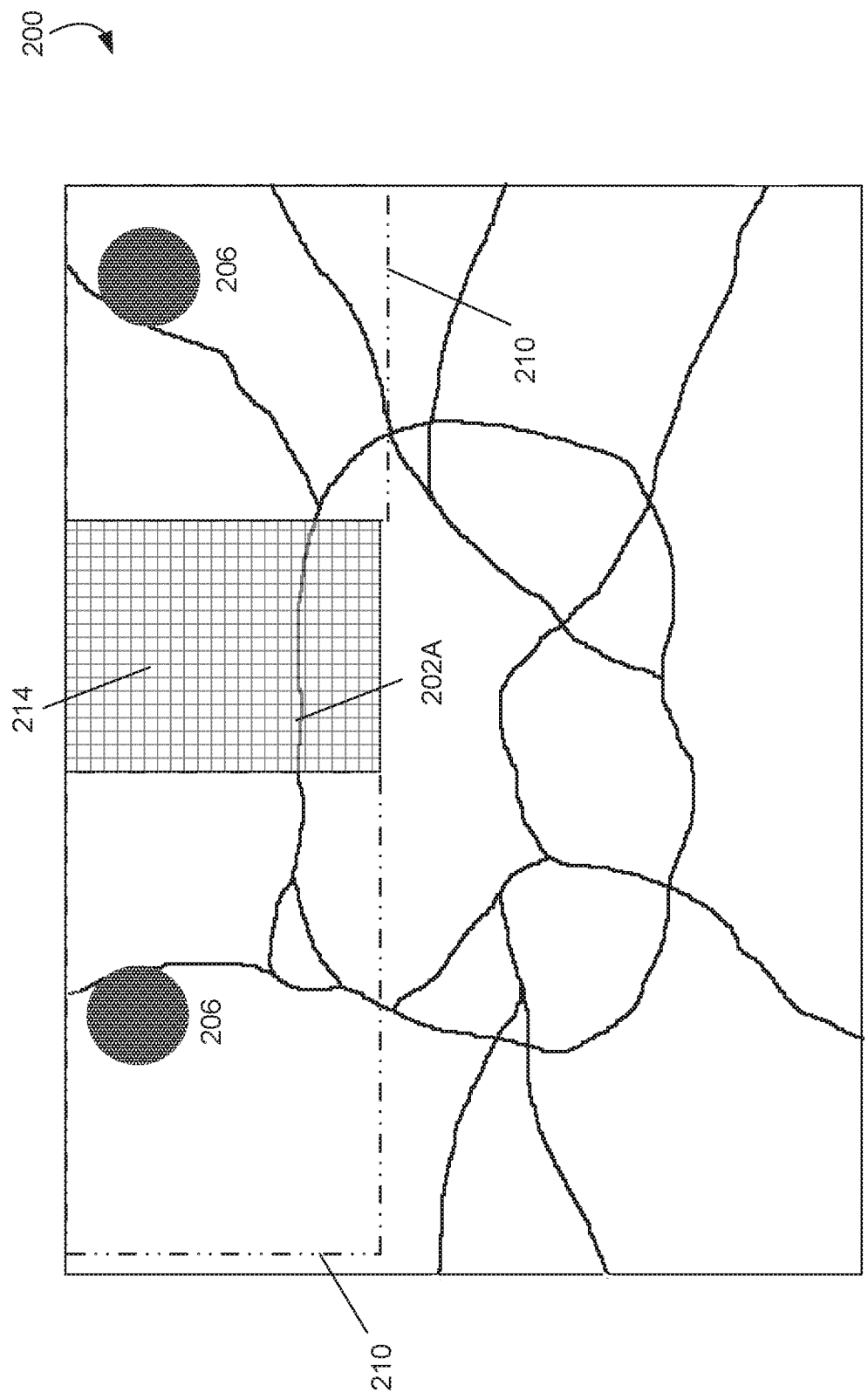

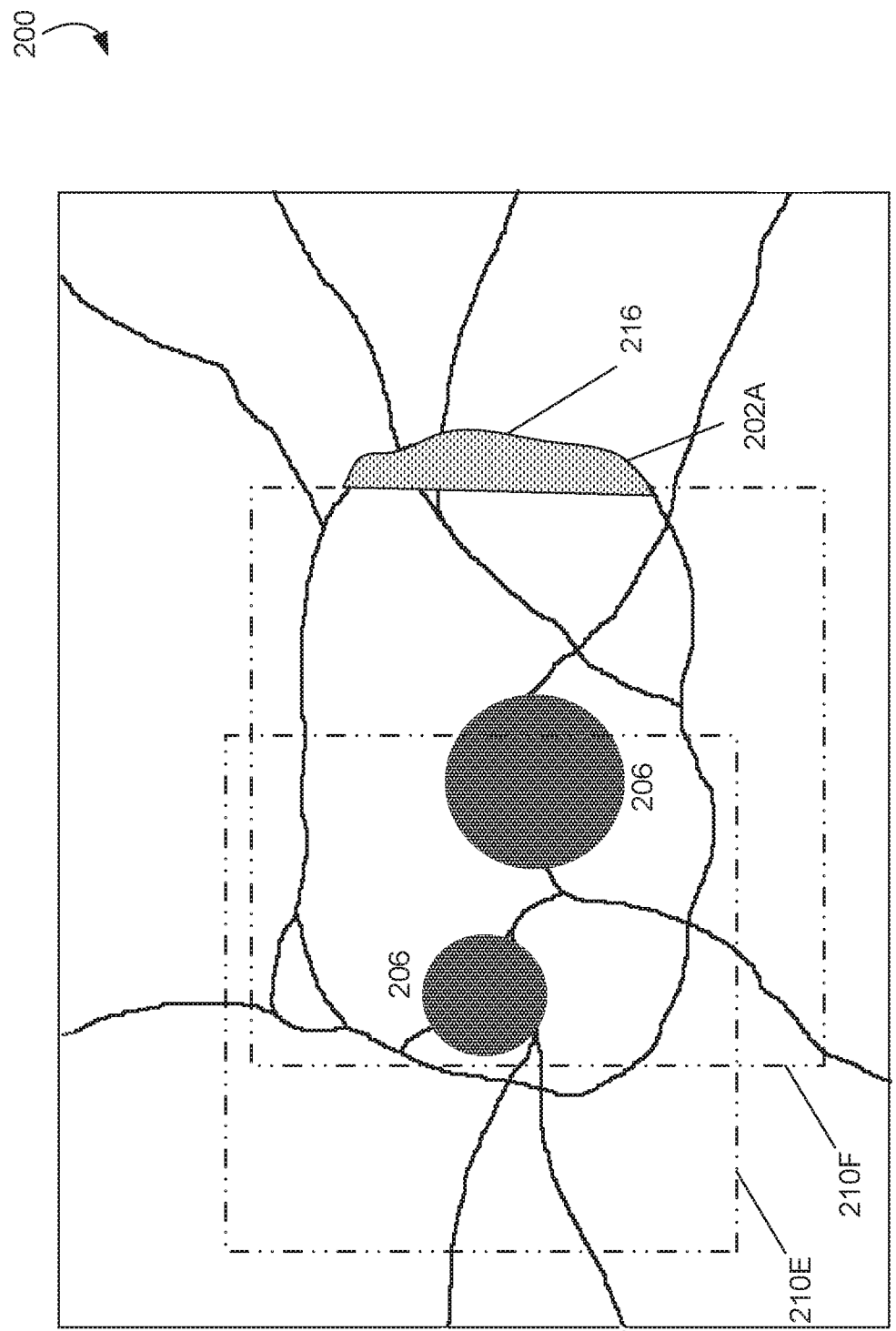

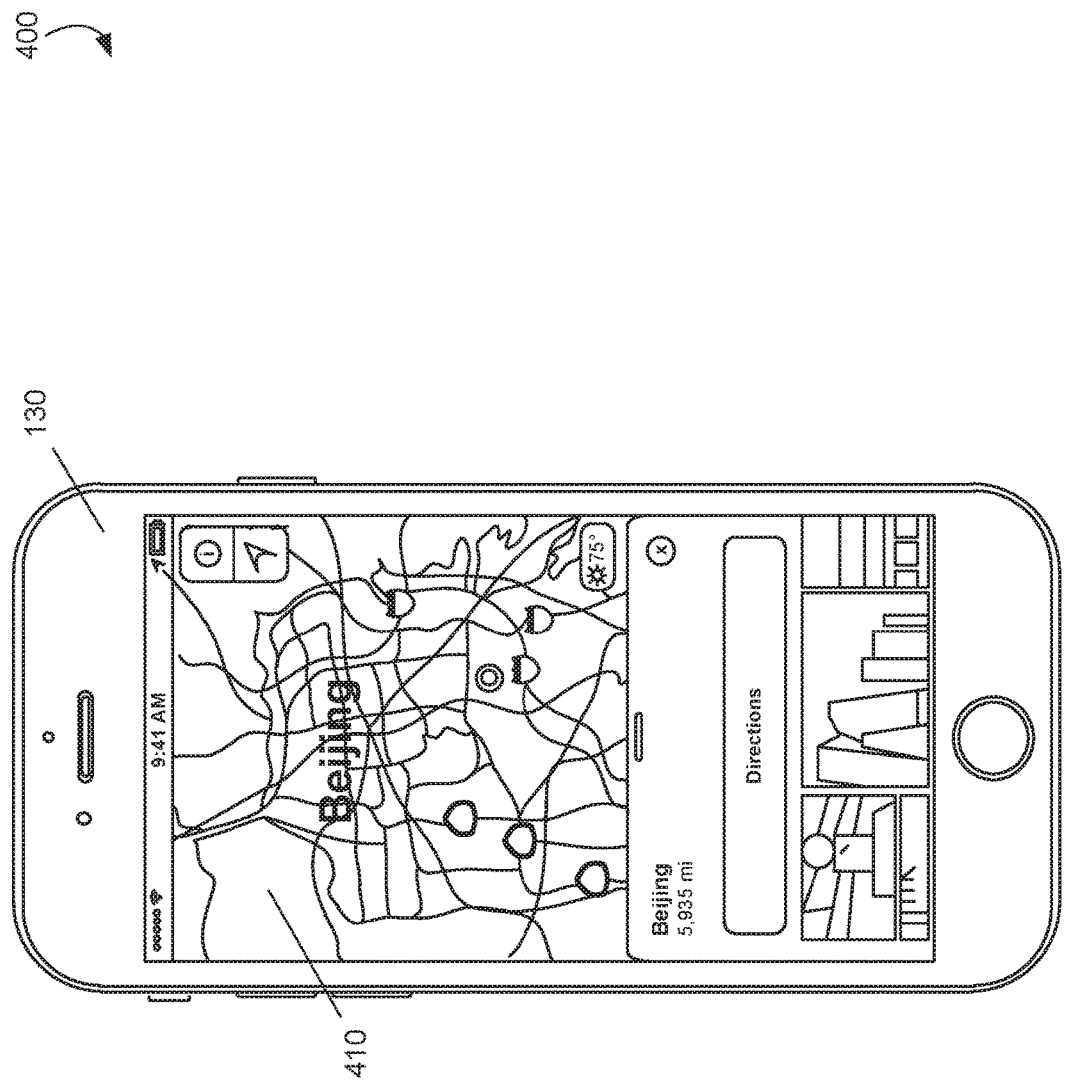

PROACTIVE DOWNLOADING OF MAPS

TECHNICAL FIELD

The disclosure generally relates to acquiring and managing map data on a device.

BACKGROUND

Mobile devices, such as smartphones, tablet computers, smart watches, and other computing devices, often include applications that provide interfaces that allow users to utilize services from network service providers. An example of such applications and/or services is map and/or navigation related applications and/or services. For example, while a user is using a map application on a mobile device, the map application can use a network (e.g., Internet connection) to obtain map data (e.g., map images, points of interest, etc.) for the mobile device's current location from a map service over the network connection. The map application can then provide various map related services to the user using the map data received from the map service. To enable the user to continue using the maps service while the mobile device is offline (e.g., not connected to the network), the map application on the mobile device can download map data and store the map data on the mobile device so that the map data can be used when the mobile device is offline (e.g., not connected to the network). However, it is not always clear to a user what maps they will need in advance (e.g., it is not clear when they will be offline), what the maps to be downloaded contain, or how to manage maps once they are downloaded.

SUMMARY

In some implementations, a computing device can identify relevant locations using location data gathered by and/or entered into the device. In some implementations, the device can proactively request offline map data for the relevant locations. A server can identify offline map data responsive to the request and send at least a portion thereof to the device in response. In some implementations, the device can suggest downloadable areas of offline map data containing the relevant locations to a user before requesting the data. The user may be able to edit the suggested location and/or search for other locations to download. The device may provide features for managing downloaded offline map content automatically and/or in response to user input.

Particular implementations provide at least the following advantages. Based on location data gathered by a device, the device can proactively download maps that may be relevant to places a user frequents or to which a user plans to go. By proactively downloading the maps data, the maps may be ready for the user on the user's device when the user travels to these places and is unable to obtain a network connection. The device can automatically determine relevant maps without user input. The device can request maps from a server without giving the server exact device locations to preserve privacy. The device can suggest predefined maps for download that may be of interest to the user, allow the user to search for predefined maps, and allow the user to edit predefined maps. The device can periodically update the offline maps. The device can manage the offline maps, for example deleting maps that may no longer have relevance and/or prioritizing offline maps for deletion to free up storage space.

Details of one or more implementations are set forth in the accompanying drawings and the description below. Other features, aspects, and potential advantages will be apparent from the description and drawings, and from the claims.

DESCRIPTION OF DRAWINGS

FIG. 2C shows an example offline map area for an approximated location.

FIG. 2E shows an example map with offline map areas for approximated locations overlaid thereon.

FIG. 2F shows an example map with offline map areas for approximated locations and a supplemental offline map area overlaid thereon.

FIG. 2G shows an example map with offline map areas for approximated locations overlaid thereon.

FIG. 9B shows an example map application map interface.

DETAILED DESCRIPTION

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Overview

Figure 1:
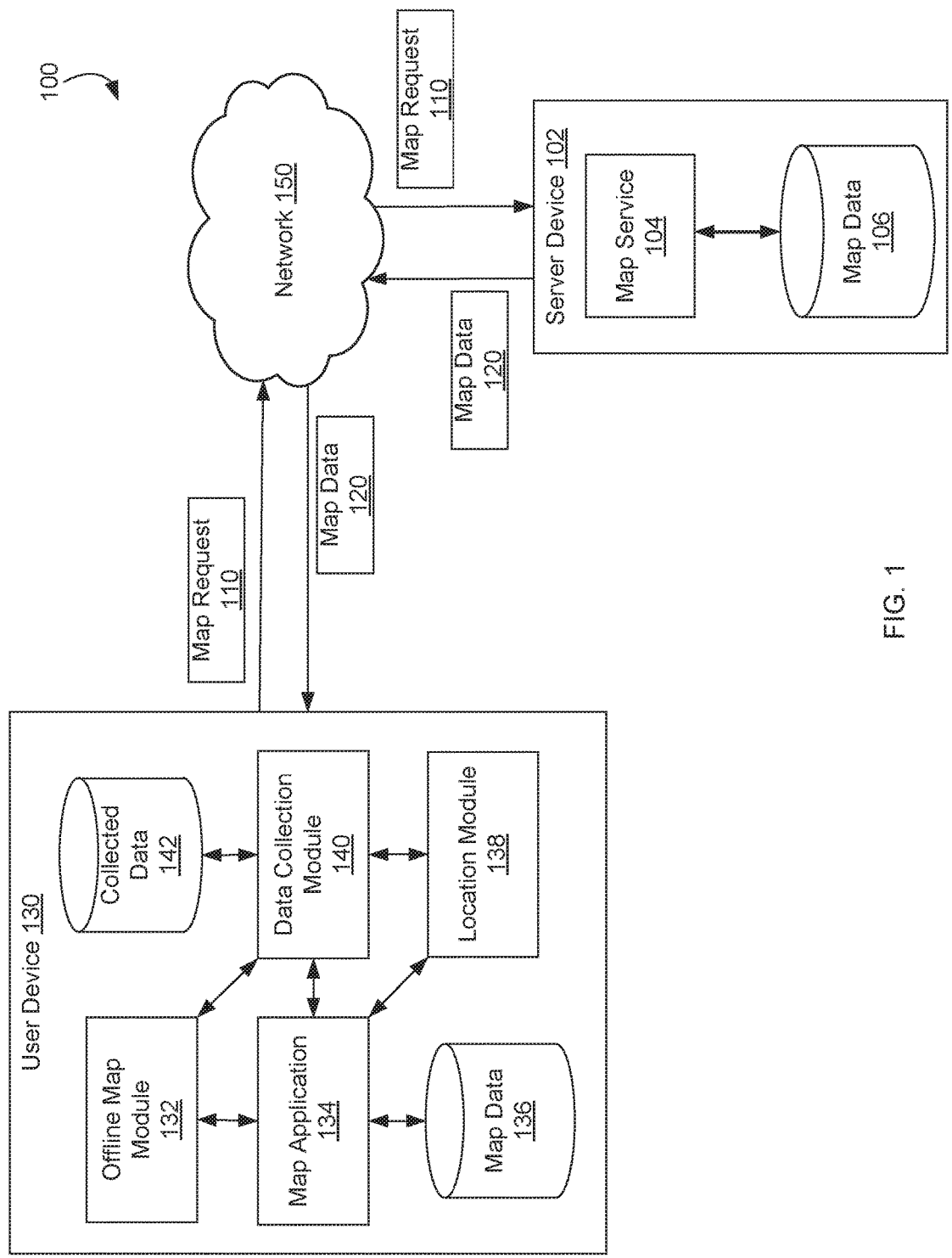
FIG. 1 is a block diagram of an example system for offline map data acquisition and management.

FIG. 1 is a block diagram of an example system 100 for offline map data acquisition and management. For example, system 100 can include a map application that allows a user to view maps, search the maps, select locations on the maps, view directions between locations on the maps, receive navigation instructions, and/or perform other tasks. The map application can be installed on a computing device and can obtain map information from a server device through a network connection. When a network connection is unavailable, the map application can use offline map data stored in computing device memory instead of data from the server device. In some implementations, the computing device can proactively download map information for areas that may be of interest to the user based on observed user behavior. In some implementations, the computing device can suggest map information for download and download the map information in response to user command.

In some implementations, system 100 can be configured to proactively determine locations for which offline map data may be relevant to a user's travel habits or interests and automatically download the map data. System 100 can be configured to suggest offline map data for download based on determined location data. System 100 can be configured to provide map search, map edit, and map data management features to a user.

In some implementations, system 100 can include server device 102. For example, server device 102 can represent a computing device or multiple computing devices associated with a map services provider. Map services provider can provide data such as map information, navigation information, and/or information about points of interest. Server device 102 can correspond to well-known server hardware architectures and include processors for performing operations for providing map services, such as the offline map data updates described herein.

In some implementations, server device 102 can include map service 104. For example, map service 104 can be a software server that provides backend processing for a map service provider. Map service 104 can, for example, obtain map data (e.g., map images, points of interest, etc.) from map data database 106 and send the map data to various client devices (e.g., user device 130) so that the client devices can present maps to the users of the client devices. Map service 104 can determine navigation and/or routing information using map data in map data database 106 and other data (e.g., real-time traffic data) and send the navigation and/or routing information to the client devices (e.g., user device 13) so that the client devices can present navigation information to the users of the client devices. For example, map service 104 can send map data to a client device while the client device is connected to server device 102 through network 150 (e.g., the Internet). The client device can present the map and/or navigation data to the user using a map or navigation application on the client device.

In some implementations, map service 104 can provide offline map data to user device 130. For example, map service 104 can provide offline map data in response to a proactive automatic offline map data request or a user-initiated offline map data request.

In some implementations, system 100 can include user device 130. For example, user device 130 can be a mobile device, such as a smartphone, tablet computer, laptop computer, smartwatch, or other computing device.

In some implementations, user device 130 can include map application 134 (e.g., Apple Maps). For example, map application 134 can be a client application of map service 104. Map application 104 can request map data from map service 104. Map service 104 can send the map data to map application 134 through network 120.

In some implementations, user device 130 can include offline map module 132. Offline map module 132 can be a component of map application 134 or a separate application. Offline map module 132 can generate offline map requests 110 automatically or in response to user input. Offline map requests 110 can specify a requested set of map data and/or define a subject area for which map data is requested. User device 130 can send map requests 110 to server device 102 through network 150. Server device 102 can respond by sending requested map data 120 to user device 130 through network 150.

In some implementations, user device 130 can store map data in map data database 136. For example, when user device 130 receives map data 120 from map service 104, map application 134 can store map data 120 in map data database 136. Map application 134 can then use the map data stored in map data database 136 to provide map related services while user device 130 is offline (e.g., not connected to network 150 and/or server device 102).

In some implementations, map application 134 can request map data updates from map service 104. For example, in response to detecting a network connection or in response to detecting a specific type of network connection (e.g., a Wi-Fi network connection), map application 134 can send a map data update request 110 to map service 104. In some implementations, map application 134 can request an update after a period of time has passed. For example, map application 134 can request map updates on a periodic interval or after an amount of time has passed since the previous update. In some implementations, map application 134 may only request map data and/or map data updates when user device 130 is connected to a power source and a WiFi network.

In some implementations, offline map module 132 can provide a graphical user interface (UI) through which a user may manage offline map data (e.g., map data stored in map data database 136). For example, the UI can provide functionality including searching for offline maps to download, automatically suggesting offline maps to download, editing offline map areas, and/or deleting data from map data database 136.

In some implementations, user device 130 can include location module 138. Location module 138 can determine the location of user device 130. For example, location module 138 may use data gathered by a global position system (GPS) receiver of user device 130 and/or a Wi-Fi receiver of user device 130 to determine the location of user device 130. Location module 138 can determine the location of user device 130 periodically and/or in response to a request from another module. For example, map application 134 can request the location of user device 130 and show the location of user device 130 on a map UI.

In some implementations, user device 130 can include data collection module 140. Data collection module 140 can monitor data generated and/or received by user device 130. Data collection module 140 can store at least a portion of the monitored data and/or generate metadata describing at least a portion of the monitored data.

For example, data collection module 140 can monitor location data generated by location module 138. By monitoring this data, data collection module 140 can determine relevant locations for a user of user device 130. Relevant locations can include places a user frequents and/or places to which a user plans to go. For example, if location module 138 reports the user device 130 as being in a particular location almost every evening between the hours of 10 PM and 6 AM, data collection module 140 can determine that the particular location is the user's home based on this pattern. If location module 138 reports the user device 130 as being in a particular location every weekday between the hours of 9 AM and 5 PM, data collection module 140 can determine that the particular location is the user's place of employment or school based on this pattern. If location module 138 reports the user device 130 as frequently visiting certain locations for extended periods of time, data collection module 140 can determine that these are locations the user may be interested in visiting again (e.g., favorite restaurants, bars, stores, or other establishments; homes of acquaintances; etc.). In some implementations, data collection module 140 can perform the monitoring according to the teachings of U.S. Pat. No. 9,615,202, the entirety of which is incorporated by reference herein.

In another example, data collection module 140 can monitor user-entered data. A user can interact with user device 130 applications, including map application 134 and other applications that are not shown. For example, a user may use map application 134 to search for restaurants and hotels in a particular area. The user may use a calendar application to schedule meetings in a particular location. The user may use a web browser application or other application to make reservations for travel and dining. The user may receive reservation confirmations in an email application. These actions can cause user device 130 to generate data indicating one or more locations (e.g., the locations of the meetings, travel destination locations, restaurant locations for the reservations, etc.). By monitoring this data, data collection module 140 can determine that these one or more locations may be relevant locations for the user of user device 130.

In some implementations, user device 130 can store collected data in collected data database 142. For example, data collection module 140 can store at least a portion of the monitored data indicating locations the user has visited or locations the user might visit and/or data describing the monitored data in collected data database 142 (e.g., addresses and/or coordinates that describe the monitored data without including details such as the nature of the location (home, school, restaurant, etc.)). The stored data may describe a collection of potential relevant locations. Accordingly, collected data database 142 can store data indicating one or more potential relevant locations. For example, the stored data can include location coordinates (e.g., latitude and longitude), location names, and/or location addresses.

In some implementations, user device 130 can explicitly define locations as relevant locations. For example, a user may be able to use a UI to define a particular location as their home, office, school, or other notable location. User device 130 can store data describing defined relevant locations in collected data database 142. For example, the stored data can include location coordinates (e.g., latitude and longitude), location names (e.g., user-assigned names and/or names in general use such as the name of an establishment), and/or location addresses.

System 100 is illustrated as comprising server device 102 and user device 130, each of which further comprise several discrete elements (e.g., map service 104 and map data database 106 of server device 102; offline map module 132, map application 134, map data database 136, location module 138, data collection module 140, and collected data database 142 of user device 130). In some implementations, elements within the respective devices (server device 102 and user device 130) can be combined or separated. For example, some elements of user device 130 can be sub-elements of a single map element or operating system element. In some implementations, map data database 136 and collected data database 142 can be parts of a single memory system of user device 130. In some implementations, functions of the various elements may be further partitioned and handled by individual elements not shown (e.g., the functions of location module 138 can be performed by a separate GPS module and WiFi module, etc.).

Proactive Map Loading

FIGS. 2A-2H illustrate several views of a map with relevant locations and areas for which offline map data can be requested overlaid thereon. These examples illustrate how offline map module 132 can use relevant locations determined by data collection module 140 to request offline map data and how map service 104 can determine map data to return that is responsive to the request.

Figure 2A:
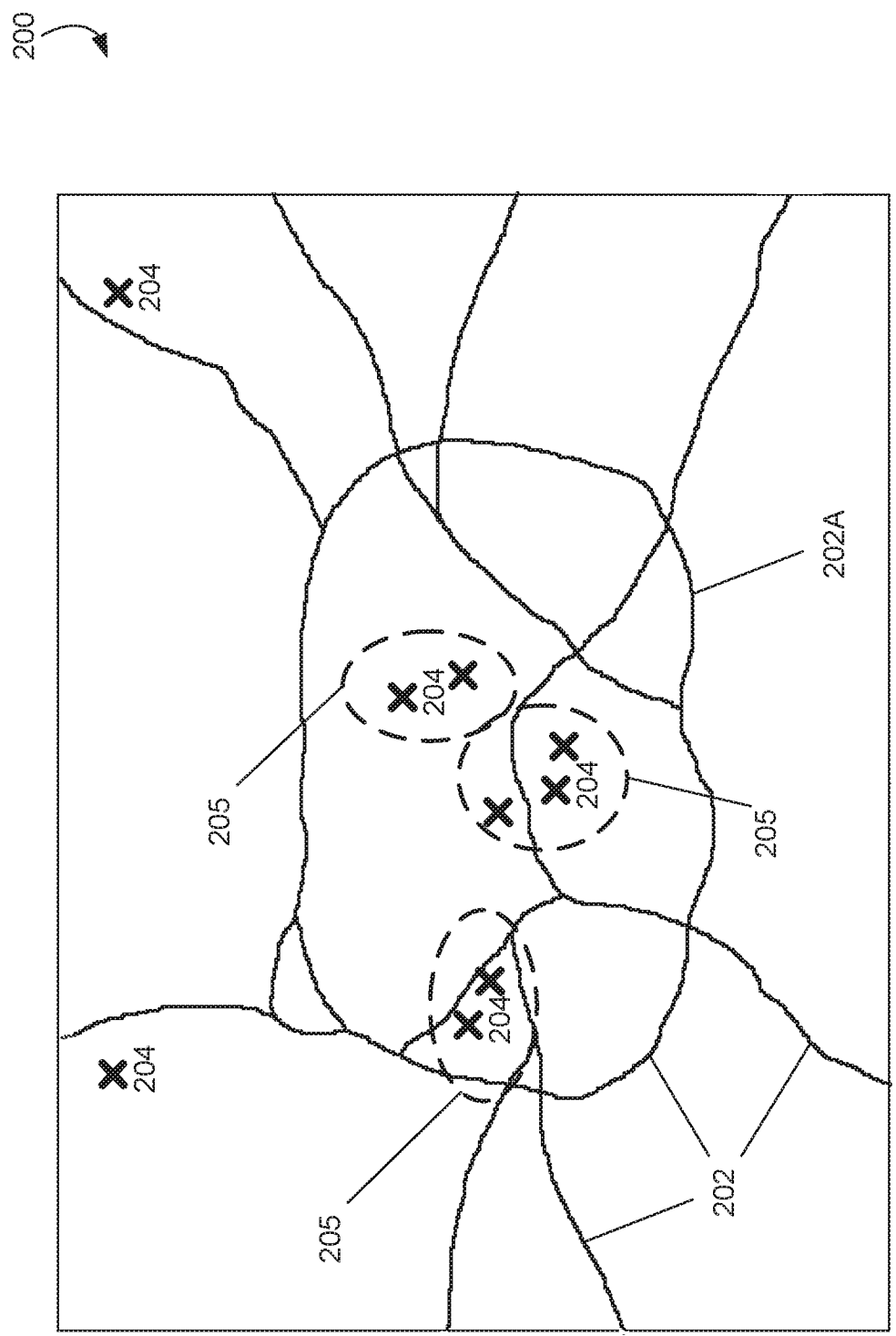
FIG. 2A shows an example map with relevant locations marked thereon.

FIG. 2A is a map 200 with relevant locations 204 marked thereon. Map 200 presents an example metropolitan area, such as a large major city and surrounding suburbs. For ease of visualization, map 200 is represented with only major highways 202 illustrated, including a beltway 202A and several other highways in an arrangement similar to those frequently seen in large cities.

Map 200 includes several relevant locations 204 for user device 130 which can be determined by data collection module 140. For example, relevant locations 204 can be places where user device 130 is often located for extended periods of time. One relevant location 204 may be the user's home, another may be the user's office, and others may be restaurants, homes of friends or family members, etc. Relevant locations 204 can be user-specified in some implementations. For example, a user can define a home location or office location. Relevant locations 204 can be found throughout map 200. In some cases, multiple relevant locations 204 can be grouped near one another, such as the three groups 205 inside beltway 202A in map 200.

In some implementations, offline map module 132 can generate offline map requests 110 to request offline map data that includes regions including one or more relevant locations 204. In order to supply relevant offline map data, map service 104 may need to know relevant location 204 so that map service 104 can select offline map data including relevant location 204. However, in some implementations, it may be desirable to send an approximation of relevant location 204 to server device 102. For example, due to privacy concerns, a user may not wish to send data indicating his or her home location over network 150. Also, as shown in the example of FIG. 2A, relevant locations 204 that are within a threshold distance from one another can often be grouped together (e.g., in groups 205), and offline map data for each individual location 204 in a group 205 may be largely redundant. In some implementations, offline map module 132 can approximate relevant locations 204 for offline map requests 110. For example, offline map module 132 can round or truncate relevant location 204 coordinates and/or cluster grouped relevant locations 204 using a clustering algorithm, as discussed below.

Figure 2B:
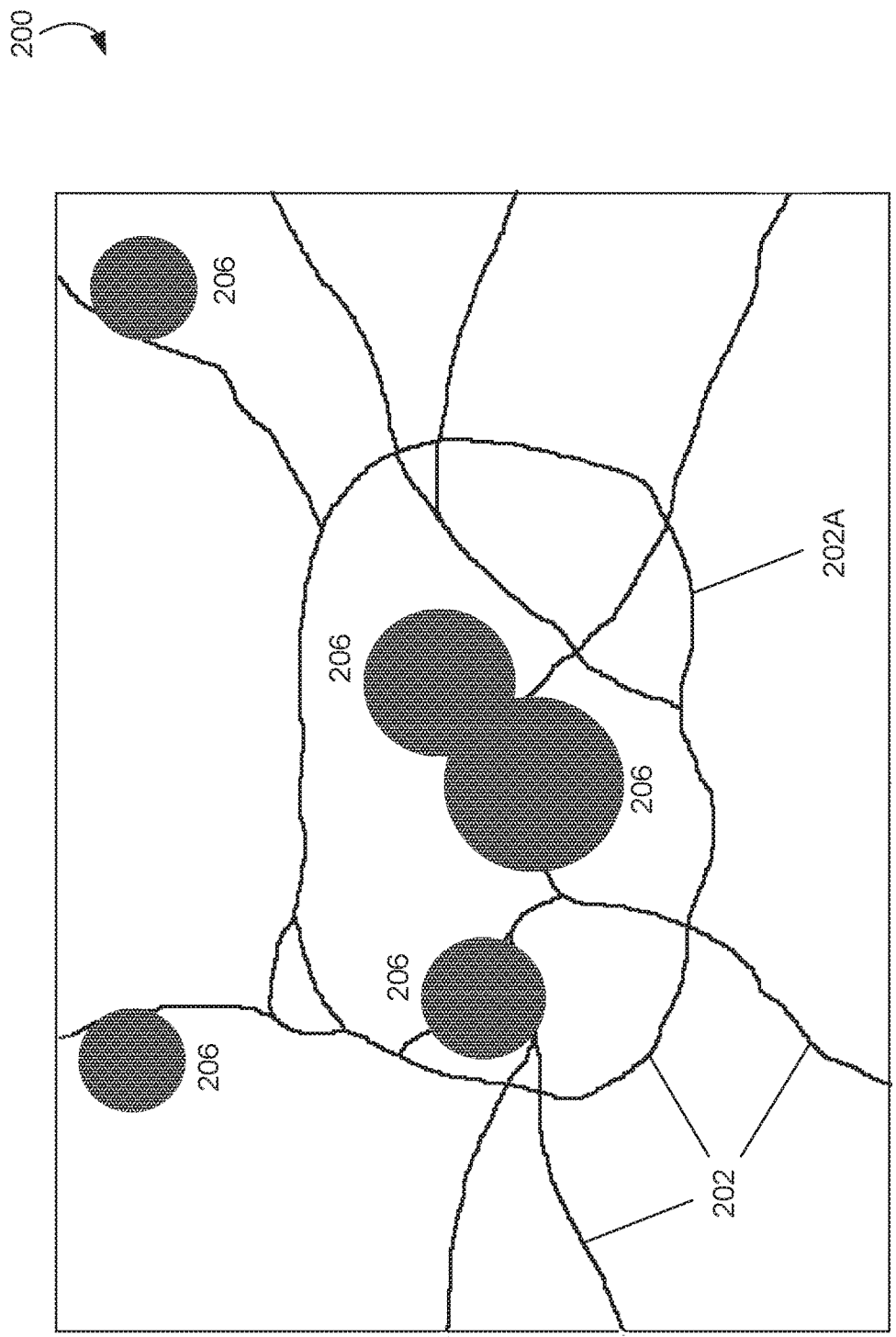
FIG. 2B shows an example with relevant locations approximated thereon.

FIG. 2B is a map 200 with relevant locations approximated thereon. In some implementations, offline map module 132 can form approximations 206 for individual relevant locations 204 or groups of relevant locations 204. Offline map module 132 can send approximations 206 to server device 102 in offline map requests 110. For example, relevant locations 204 can be expressed in decimal latitude and longitude degrees (e.g., 41.5061° N, 81.6995° W). To approximate a relevant location 204, offline map module can truncate decimal degrees (e.g., 41.5° N, 81.6° W) or round decimal degrees (e.g., 41.5° N, 81.7° W). Likewise, if relevant locations 204 are expressed in degrees, minutes, seconds format, offline map module 132 can truncate the coordinates by omitting seconds. In some implementations, offline map module 132 can identify a centroid for closely-grouped relevant locations 204 and use the centroid as an approximation 206. In some implementations, offline map module 132 can define an area (e.g., a circle) encompassing several closely-grouped relevant locations 204 and use the area as an approximation 206.

In some implementations, map service 104 can receive and process offline map request 110. For example, map service 104 can get approximation 206 from offline map request 110 and determine offline map data including an area surrounding approximation 206. FIG. 2C is an offline map area 210 for an approximated relevant location. Approximation 206 of FIG. 2C can be any approximation 206 of FIG. 2B, or a different approximation 206 not shown in FIG. 2B, and is shown on its own in FIG. 2C for ease of illustration. Map service 104 can define a polygon (e.g., square or rectangle or other polygon having more or less than four sides) surrounding approximation 206. For example, map service 104 can extend the polygon by adding a predetermined distance 208 from approximation 206 in a plurality of directions (e.g., for a square, four directions), thereby adding a buffer area around approximation 206. Map service 104 can define a new, larger polygon encompassing the buffered area. The polygon may form the offline map area 210 responsive to offline map request 110. For example, approximation 206 can represent 1 square kilometer, and server device 102 can extend the area 25 kilometers in each direction, resulting in a 51 square kilometer offline map area 210. Other implementations may use different sizes for approximation 206 and distance 208, resulting in different sizes for offline map area 210.

In some implementations, map service 104 can adjust the position of approximation 206 prior to extending the area. For example, approximation 206 can be moved to snap to a grid or quadtree so that offline map area 210 corresponds to a predefined downloadable portion of map data. Snapping to a grid or quadtree can include fitting the approximation 206 to the predefined downloadable portion. For example, if approximation 206 represents 1 square kilometer, map service 104 can adjust the position of approximation 206 to fit a 1 square kilometer node in a quadtree. Snapping to a known data structure can keep offline map areas 210 consistent in size. Because map service 104 extends the area by the predetermined distance 208, a minor adjustment of approximation 206 can provide an offline map area 210 that remains relevant to the user. For an example of a quadtree structure that can define map data to be downloaded, see FIG. 3, discussed below.

In some implementations, server device 102 can generate a definition of offline map area 210. For example, the definition can include two coordinates 212 defining opposite corners of the square offline map area 210. In another example, the definition can include a line boundary defining the edges of the offline map area 210.

Figure 2D:
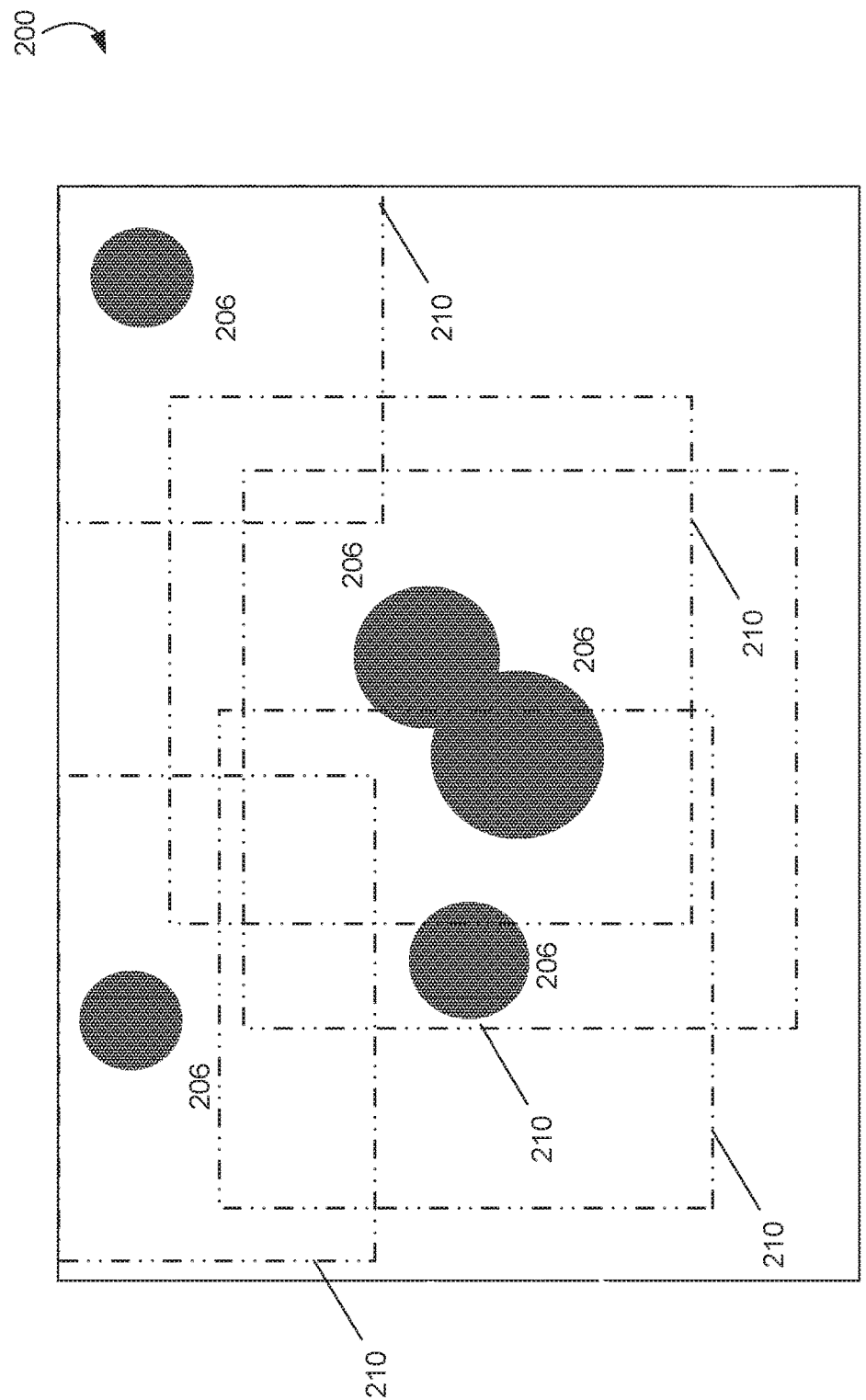
FIG. 2D shows a plurality of example offline map areas for the approximated locations of FIG. 2B.

Server device 102 can send the definition of offline map area 210, rather than all map data within offline map area 210, to avoid sending redundant data. For example, FIG. 2D is an example map 200 wherein multiple offline map areas 210 overlap, with roads 202 omitted for visual clarity. User device 130 can send requests for multiple approximations 206 whose offline map areas 210 may overlap. For example, user device 130 can first send a request for offline map area 210A. A first transaction may provide offline map data for one offline map area 210A. User device 130 can determine a difference between the offline map data received in the first transaction and the offline map data still required for overlapping offline map area 210B. In a second request, user device 130 may only request map data to fill in what does not overlap. In a second transaction, user device 130 can receive any map data it is missing for offline map area 210B from server device 102.

There may be situations where extending the area out from approximations 206 does not provide a fully useful set of offline map data. For example, FIG. 2E is a map with offline map areas 210C and 210D for approximated relevant locations overlaid thereon. In this example, the two offline map areas 210C and 210D may represent two locations a user commutes between (e.g., home to work and back). Offline map areas 210C and 210D are far enough apart that they do not overlap. Moreover, routes between approximations 206, such as highway 202A, are not fully contained within offline map areas 210C and 210D. Without the routes between approximations 206 included in the offline map data, a user may be unable to use map application 136 for a full commute between offline map areas 210C and 210D when a network connection is unavailable.

In some implementations, map service 104 can determine that additional offline map data is needed beyond what is prescribed for offline map areas 210C and 210D through the extending discussed above. For example, map service 104 can determine that additional offline map data is needed because the prescribed data does not contain common commute routes between offline map areas 210C and 210D or does not contain an entire municipality or geographic area mostly encompassed by offline map areas 210C and 210D. FIG. 2F is a map 200 with offline map areas 210C and 210D for approximated relevant locations and supplemental offline map area 214 overlaid thereon. Map service 104 can identify supplemental offline map area 214 to encompass potentially relevant space between relevant locations. For example, potentially relevant space may contain commuting routes like beltway 202A, continuous neighborhoods or cities linking the relevant locations, etc. To capture this space, map service 104 can extend a first offline map area 210C to contact the other offline map area 210D, adding supplemental offline map area 214 to the area definition of the first offline map area 210C. For example, in FIG. 2F, offline map area 210C on the left can be defined using a top left coordinate for the box formed by extending the area around approximation 206 and a bottom right coordinate at the bottom right corner of supplemental offline map area box 214, essentially defining a single box.

Figure 2H:
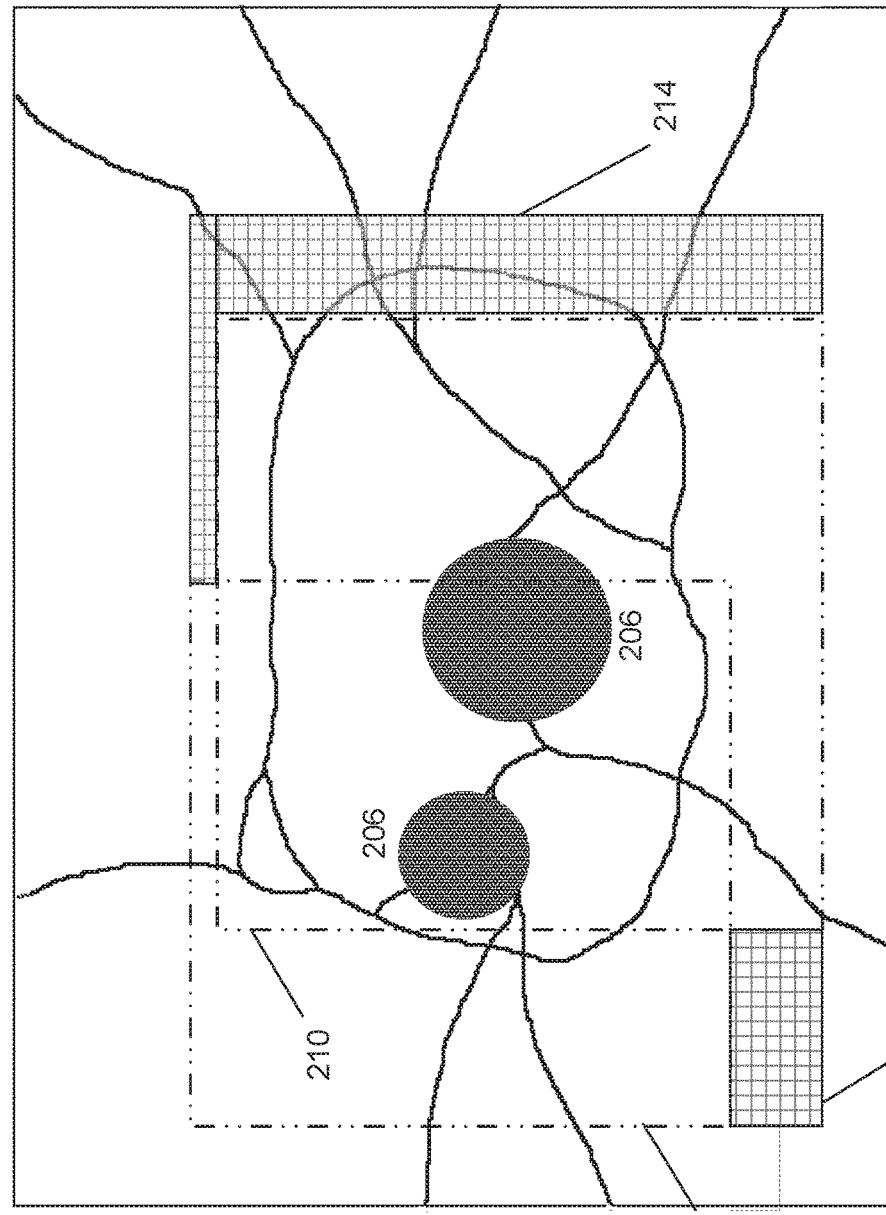
FIG. 2H shows an example map with offline map areas for approximated locations and a supplemental offline map area overlaid thereon.

In some implementations, map service 104 can merge offline map area boxes 210 into a single box. FIG. 2G is a map with offline map areas 210E and 210F for approximated relevant locations overlaid thereon. In this example, most of the area inside beltway 202A is covered by offline map areas 210E and 210F, but not all of it. Area 216 is inside beltway 202A but outside offline map areas 210E and 210F. Map service 104 can determine that all areas inside beltway 202A are relevant for a request including these particular approximations 206. For example, the area inside beltway 202A can be a single municipality known to map service 104. Because offline map areas 210E and 210F contain a majority of the municipality (e.g., a percentage above a threshold), map service 104 can determine that the entire municipality is relevant to the request. Accordingly, as shown in FIG. 2H, map service 104 can merge both offline map areas 210E and 210F into a single area including supplemental offline map areas 214. Server device 102 can return corner coordinates for the large box containing offline map areas 210E and 210F and supplemental offline map areas 214, thereby defining a single box. In some situations (e.g., when the supplemental area does not fit neatly within a rectangle), server device 102 can define a different polygon surrounding the supplemental area and return coordinates defining the polygon.

In some implementations, map service 104 can organize map data in map data database 106 into a quadtree structure, as noted above. In some implementations, user device 130 can receive coordinates defining offline map area 210 from server device 102, identify offline map data within offline map area 210 that is not already in map data database 136, and request the missing data from server device 102. For example, the map data in map data database 106 can include different map data categories. For example, a category can correspond to data for calculating routes. A second category can correspond to road networks. A third category can correspond to points of interest. A fourth category can correspond to any other logically related grouping of map data. Map service 104 can generate a different quadtree structure for each category of map data stored in map data database 106.

Figure 3:
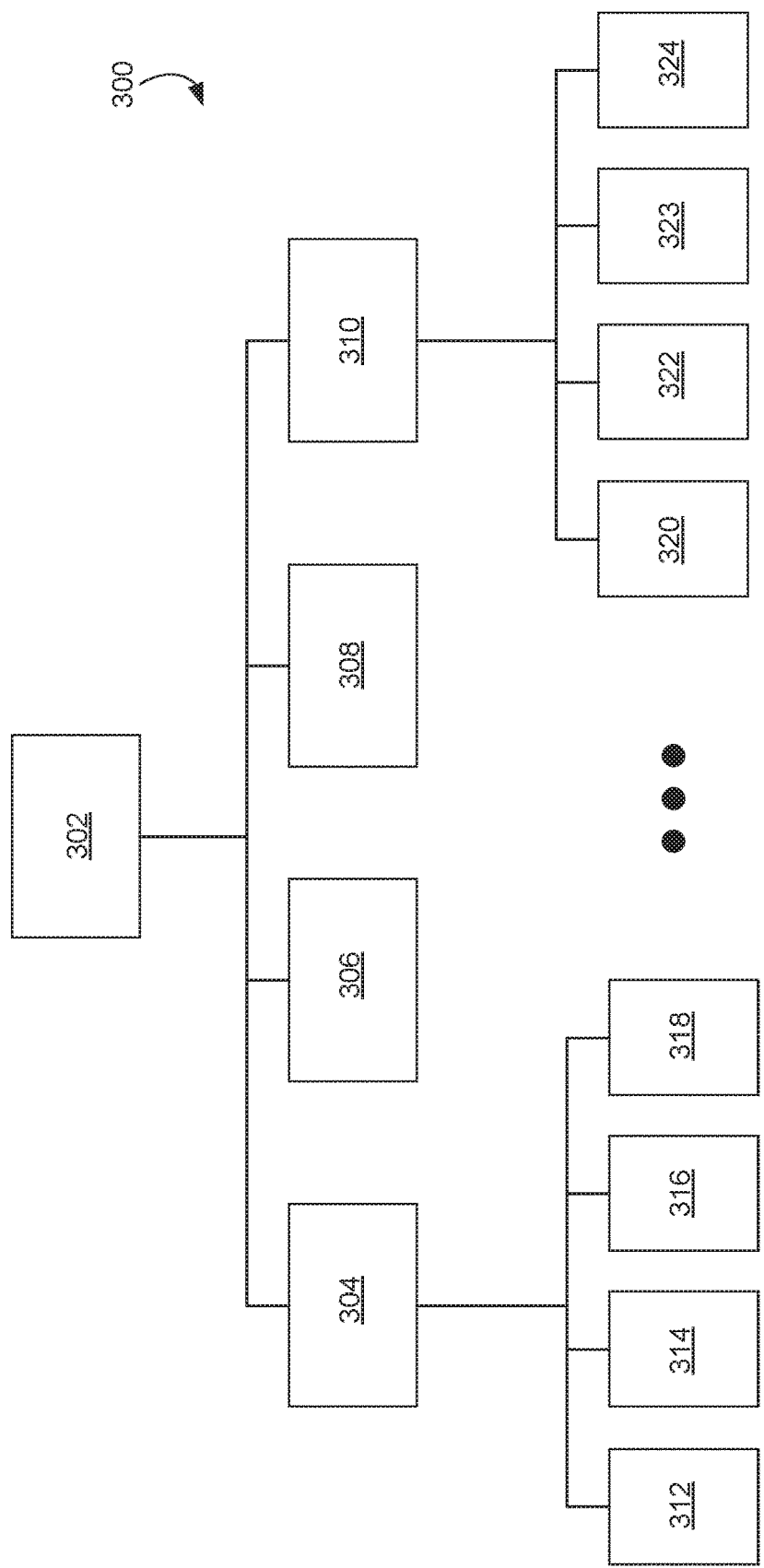
FIG. 3 shows an example quadtree structure for organizing map data.

FIG. 3 illustrates an example quadtree structure 300 for organizing map data. To generate quadtree structure 300, map service 104 can determine a metric for organizing the map data objects within the map data for a category. For example, the map data in map data database 106 can include many different map data objects for each map data category. When map service 104 is building a quadtree for the points of interest map data category, map service 104 can generate a metric for each point of interest map data object within the points of interest category. For example, if a point of interest object corresponds to the Golden Gate Bridge in San Francisco, then the point of interest object can include attributes that describe the name of the point of interest, the location of the point of interest, and a reference to any related point of interest objects, or other map data objects. Map service 104 can use the attributes of the point of interest object to generate a metric or identifier for the point of interest object. For example, map service 104 can use the location of the point of interest object to generate a metric that uniquely identifies the point of interest object and that inherently provides an order for the point of interest object relative to other point of interest objects.

In some implementations, map service 104 can generate quadtree structure 200 using the generated metric (e.g., globally unique identifier—GUID) for each map data object. For example, map service 104 can generate the quadtree such that each leaf node 312-324 in quadtree 300 corresponds to a geographical area that has the same size as other leaf nodes in the quadtree, while nodes at each level of the quadtree correspond to geographical areas of different sizes. For example, the geographical area corresponding to a parent node can be divided among children nodes at different levels until leaf nodes of a certain size (e.g., geographical size, data size, etc.) are obtained. For example, the root node 302 (level 1) of a quadtree stored at server device 102 may correspond to the earth. Level 2 of the quadtree may include four nodes 304, 306, 308, 310 each corresponding one quarter of the earth, and so on until leaf nodes 312-324 covering some relatively small geographical area are generated.

Moreover, map data can be distributed across each node in the quadtree (e.g., across and/or up and down) so that each node in the quadtree stores the same amount of data. When assigning data to nodes in the quadtree, map service 104 can use the generated metric to distribute the map data objects to the nodes of the quadtree in an ordered manner. For example, each branch and/or node in the quadtree can cover a range of identifiers (metrics) for map data objects. Map data objects can be routed to a node in the quadtree based on the identifier for the map data object and the range covered by each branch/node. If a map data object cannot fit (e.g., either geographically or data size) within a single leaf node, the map data object can be stored in a parent node that can accommodate the size of the map data object.

In some implementations, user device 130 can request offline map data by requesting download of quadtree nodes. For example, based on the coordinates defining offline map area 210, user device 130 can determine which nodes in the quadtree are already stored in map data database 136 (if any) and which nodes should be requested from server device 102 (if any).

In some implementations, user device 130 can send a download request to server device 102 specifying individual nodes for download. For example, user device can request nodes 312 and 314 of quadtree 300.

In some implementations, user device 130 can send a download request to server device 102 specifying a single individual node and a level to which the quadtree should be traversed. For example, user device 130 can request node 304 and two levels. In response, server device 102 may return node 304 (the first level) and all nodes in the next level (312, 314, 316, and 318). In another example, user device 130 can request node 302 and two levels. In response, server device 102 may return node 302 (the first level) and all nodes in the next level (304, 306, 308, and 310). A request for node 302 and three levels can cause every node illustrated in FIG. 3 to be returned.

Offline Map Management

Figure 4A:
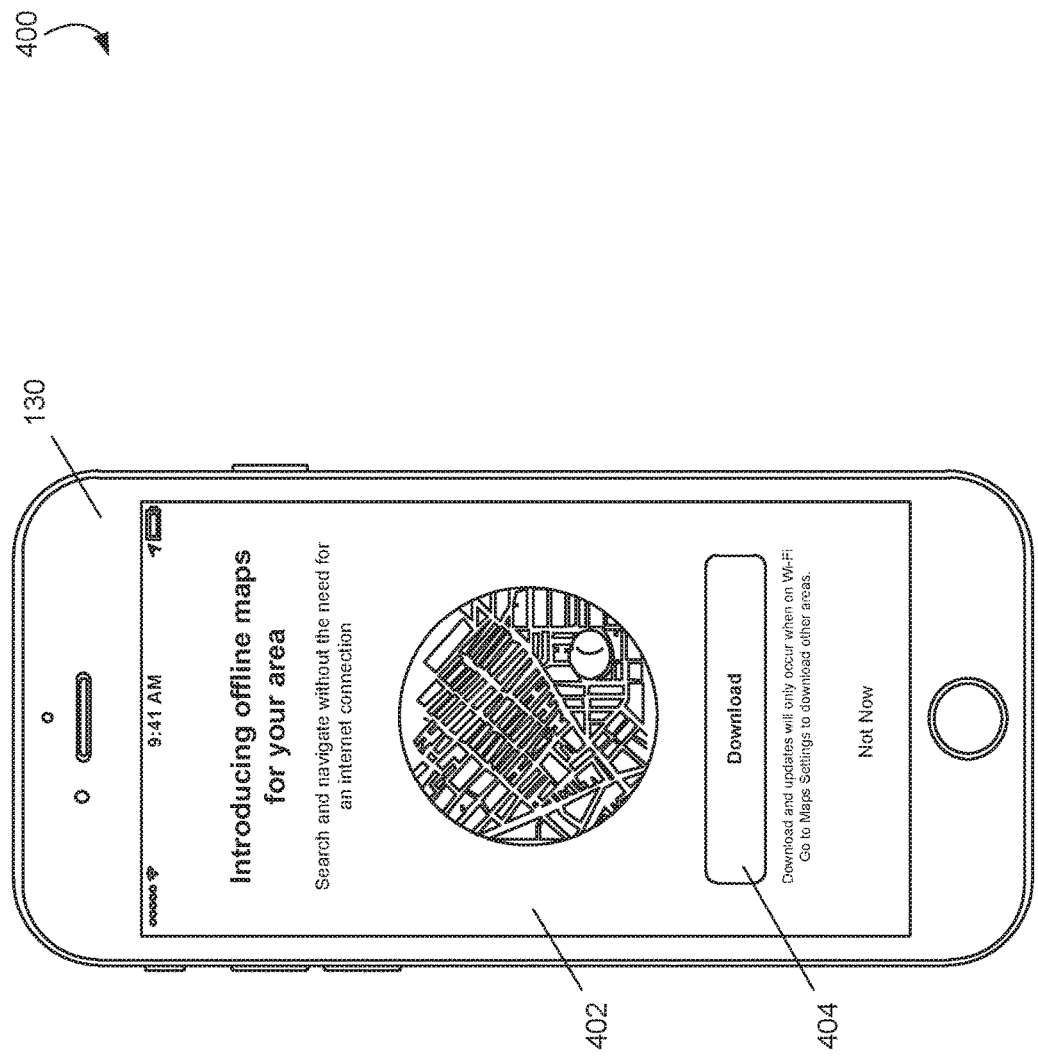
FIG. 4A shows an example map application introduction interface.

FIGS. 4A-Y illustrate several examples of a user interface for downloading and managing offline maps with user device 130.

In some cases, a user may wish to download specific offline maps in addition to those automatically downloaded as described above. In some implementations, user device 130 may have proactive map loading disabled, or may not be configured for proactive map loading. In other implementations, user device 130 may proactively load offline maps. In either case, user device 130 can also provide a UI allowing the user to find, edit, and select maps for download. The UI can also allow the user to manage downloaded maps, for example by deleting or editing offline map data.

In some implementations, map application 134 can offer map data download suggestions. As discussed above with respect to FIGS. 2A and 2B, offline map module 132 can generate offline map requests 110 to request offline map data including one or more relevant locations identified by data collection module 140. In some implementations, offline map module 132 can approximate relevant locations for offline map requests 110 and send offline map request 110 to server device 102. Offline map module 132 can include a current location determined by location module 138 in the request. Server device 102 can identify one or more downloadable map areas containing the approximated relevant locations and/or current location. In some implementations, the downloadable map areas may be preset areas encompassing geographical and/or political units (e.g., cities, regions, countries, etc.). The preset areas can be selected because they correspond to approximated relevant locations in collected data database 142 and/or current location determined by location module 138, for example. Preset areas can be generated and stored in map data database 106. The preset areas may be defined by an administrative user and/or defined to correspond to natural and/or political boundaries. This may be contrasted with being defined by establishing a point of interest (e.g., a home location), extending a radius from the point of interest, and drawing a boundary based on the radius; or centering a preset boundary around a point of interest; as performed by other map download systems and methods.

In some cases, server device 102 can identify multiple preset download maps containing the locations. Maps at different zoom levels may be available for download. For example, when an offline map request 110 includes several approximate locations in San Francisco, server device 102 can identify a San Francisco map and a Bay Area map. Map data database 106 can store multiple zoom levels or granularity levels of offline map data, but map service 104 may not offer every level for download. Restricting available downloads to certain levels can reduce data demands on system 100. For example, individual neighborhoods in San Francisco may be unavailable to download individually, even if they encompass every location in an offline map request 110. Likewise, very large regions such as California or the United States may be unavailable to download individually. For example, because map areas can be preset, map data database 106 can conserve storage by not storing separate map definitions for individual neighborhoods, and user device 130 can request fewer downloads by downloading a city in bulk rather than separate neighborhoods one by one. On the other hand, downloads that are too large for user device 130 memory can be avoided by making very large regions unavailable. Avoiding these downloads can also reduce network 150 bandwidth use.

In some implementations, map application 134 can offer map data download suggestions based on user interactions with map application 134. For example, FIG. 4A shows map UI 400 introduction interface 402. When a user first launches map application 134, map application 134 can display introduction interface 402. Using location data from location module 138 and/or data gathered by data collection module 140 as described above, map application 134 can determine an appropriate area to suggest. In this example, user device 130 is located in San Francisco, and map application 134 is suggesting offline map data for San Francisco based on location determined by location module 138. In other examples, offline map data can be suggested based on relevant locations stored in collected data database 142. UI 400 can include download button 404. The user can select download button 404 to download the suggested map data from server device 102.

Figure 4B:
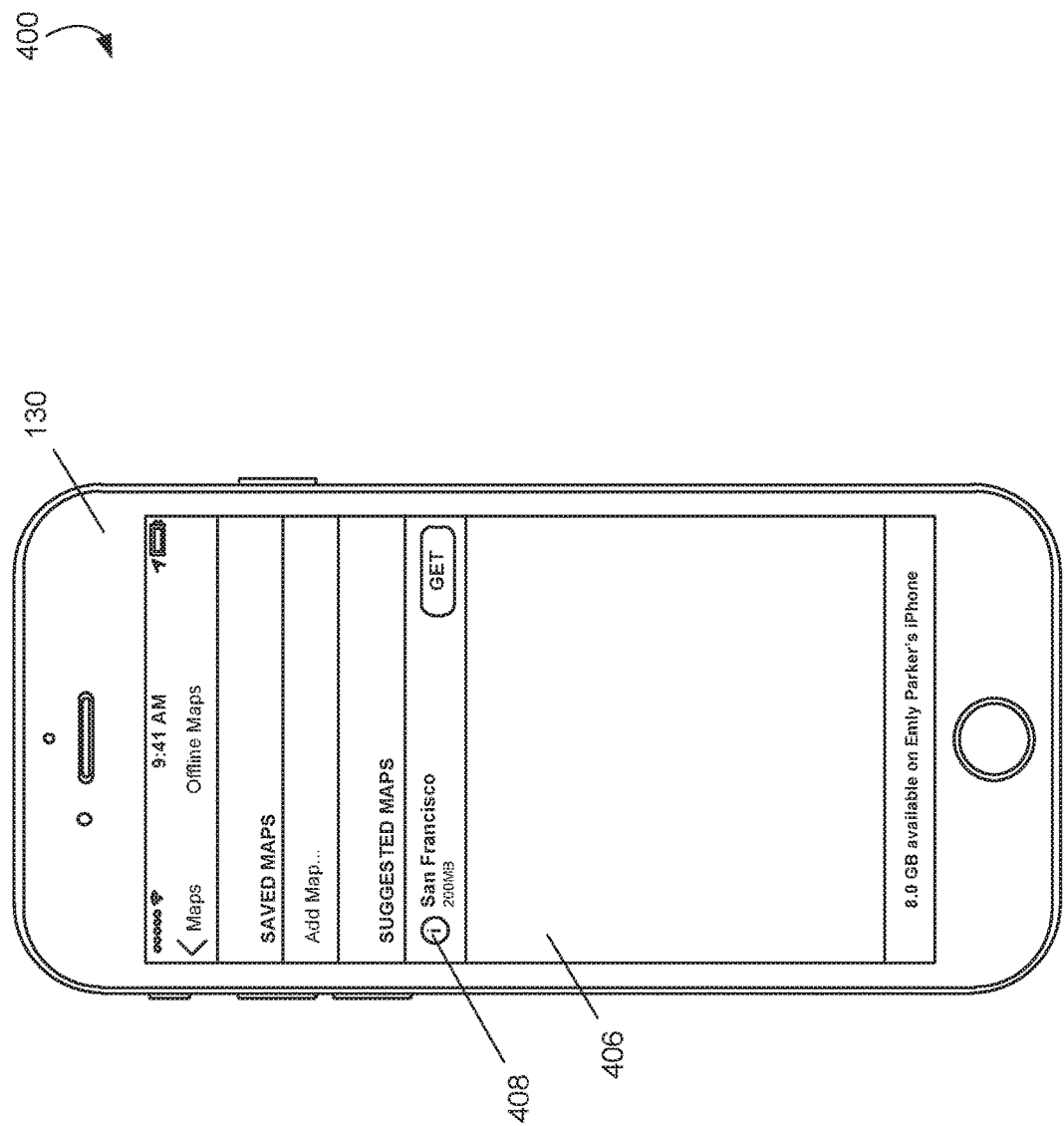
FIG. 4B shows an example map application settings interface.

In some implementations, map application 134 can offer map data download suggestion functionality in other UIs. For example, FIG. 4B shows map UI 400 settings interface 406. Using location data from location module 138 and/or data gathered by data collection module 140 as described above, map application 134 can determine an appropriate area to suggest. In this example, user device 130 is located in San Francisco, and map application 134 is suggesting offline map data for San Francisco. UI 400 can include element 408 displaying a name of the suggested map and an option to download the suggested map. The user can select element 408 to download the suggested map data from server device 102.

Figure 4C:
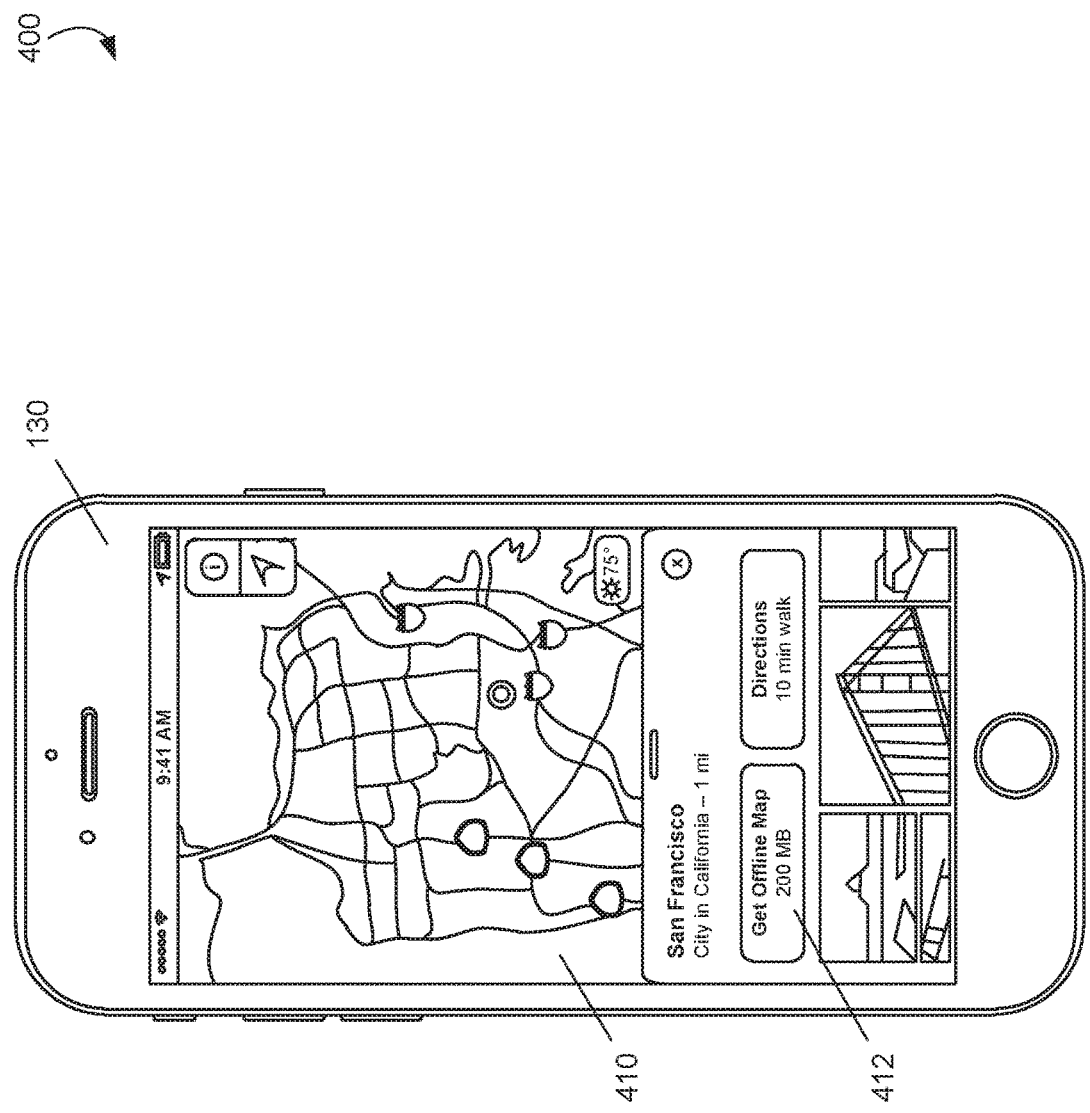
FIG. 4C shows an example map application map interface.

In some implementations, map application 134 can offer map data download suggestions for an area a user is viewing. For example, FIG. 4C shows map interface 410, which can be a specific UI within the general map UI 400. In this example, map interface 410 is showing an area partially including most or all of San Francisco. Map application 134 can provide suggestion 412 to download an offline map containing or substantially overlapping with the area shown. For example, in FIG. 4C, suggestion 412 suggests offline map data for San Francisco. The user can select suggestion 412 to download the suggested map data from server device 102.

Figure 4D:
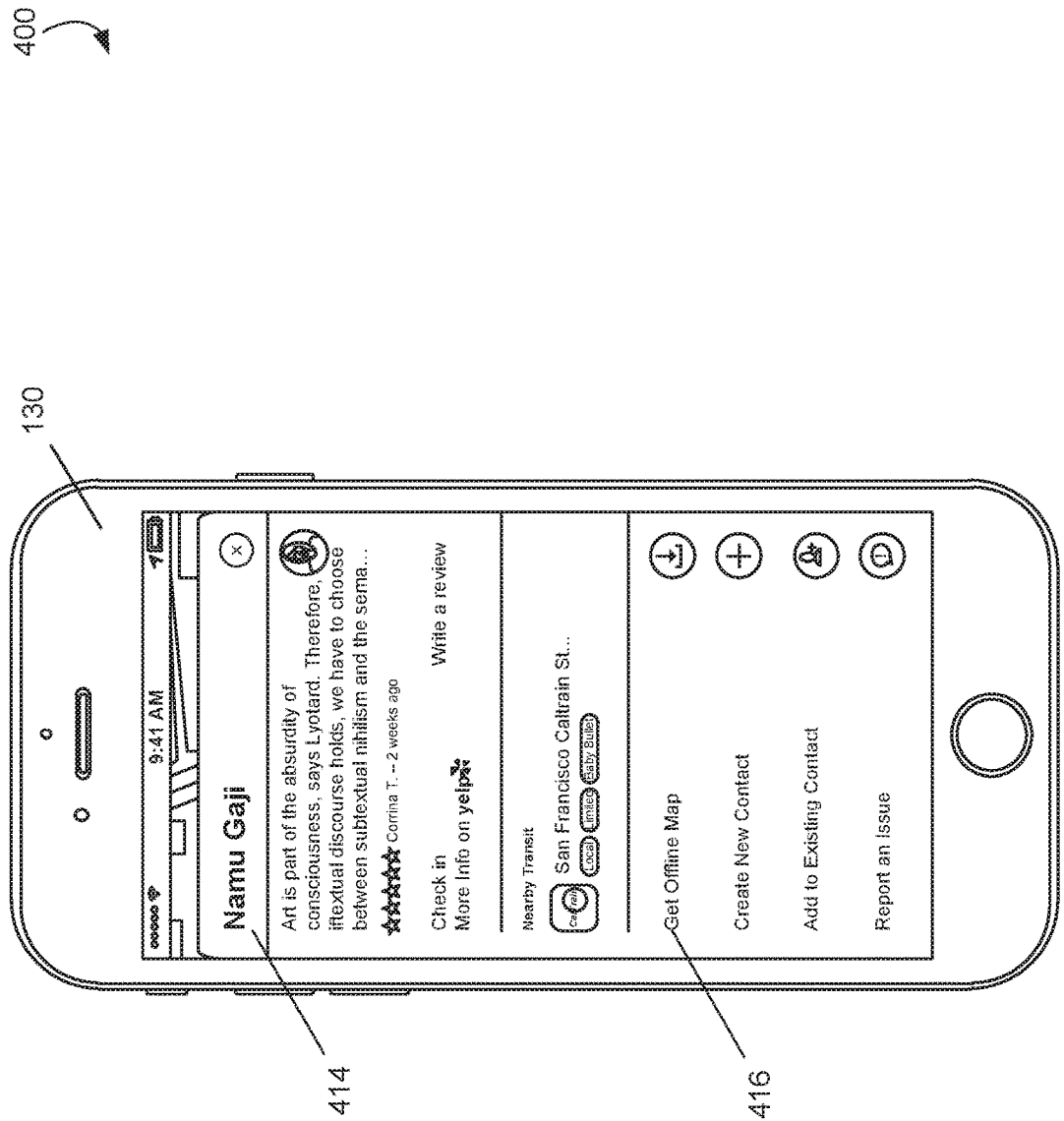
FIG. 4D shows an example map application information interface.

In some implementations, map application 134 can offer map data download suggestions while displaying detailed information about a location. For example, FIG. 4D shows information interface 414 (e.g., a placecard), which can be a specific UI within the general map UI 400. A user can click on location names within map UI 400 or from external sources (e.g., links in other apps). In response, map application 134 can display information interface 414. In this example, information interface 414 shows details about a restaurant a user has selected. Map application 134 can provide suggestion 416 to download an offline map containing the location being detailed. For example, in FIG. 4D, suggestion 416 offers download of offline San Francisco map data because the restaurant is located in San Francisco and/or because the San Francisco map data includes both the restaurant and the current location of user device 130, allowing for offline navigation to the restaurant from the current location. The user can select suggestion 416 to download the suggested map data from server device 102.

Figure 5A:
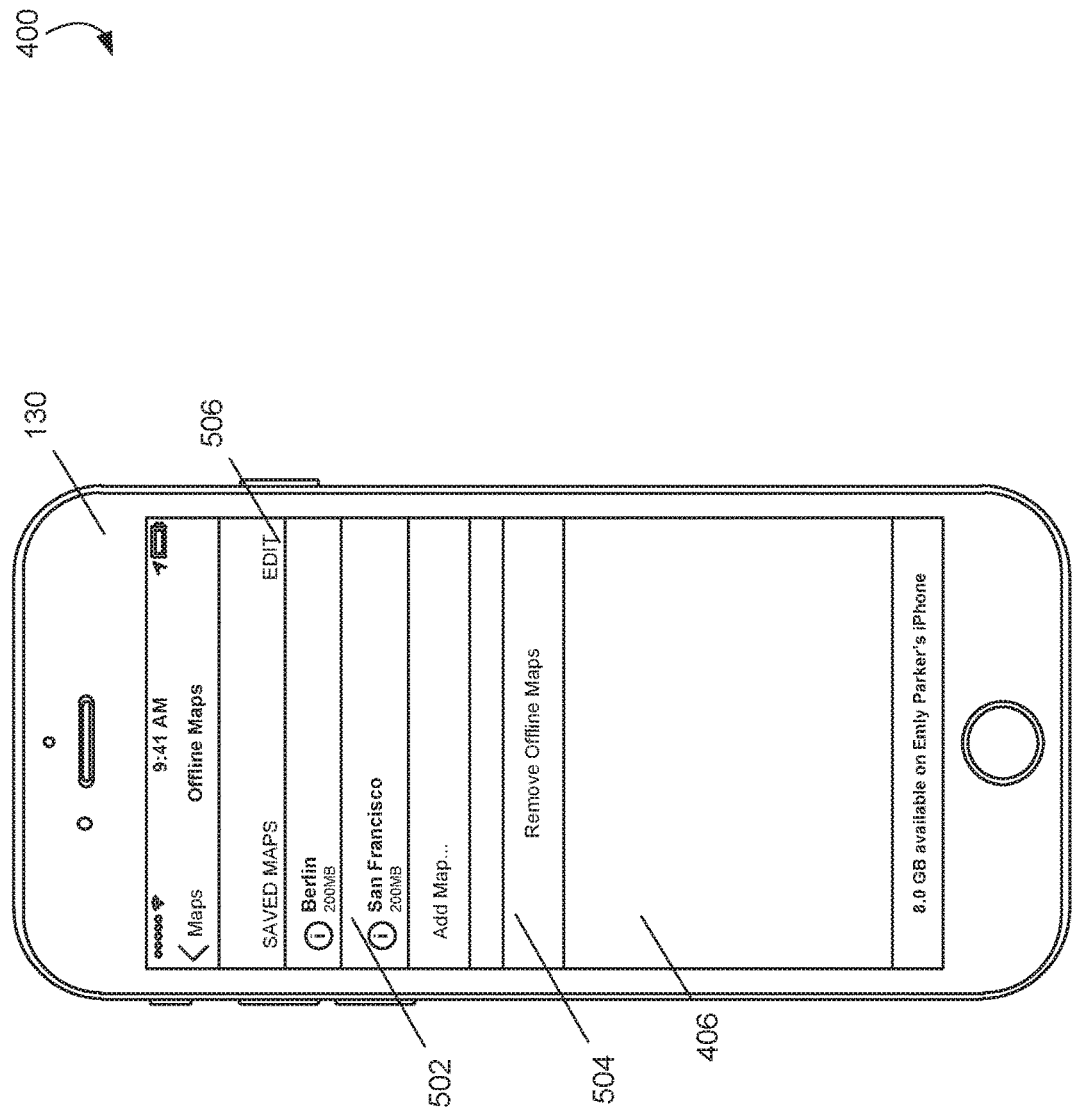
FIG. 5A shows an example map application settings interface.

In some implementations, map UI 400 can provide functionality for deleting offline map data that has been downloaded previously. For example, FIG. 5A shows settings interface 406, which can be a specific UI within the general map UI 400. Settings interface 406 can list previously downloaded maps (e.g., Berlin and San Francisco). Map listings 502 can be user-selectable. For example, a user may be able to swipe on a map listing 502 to bring up a delete button, which the user can click to cause map application 134 to delete the selected map data from map data database 136. Settings interface 406 can include remove offline maps object 504, which can cause map application 134 to delete all user-downloaded map data from map data database 136 when selected.

Figure 5B:
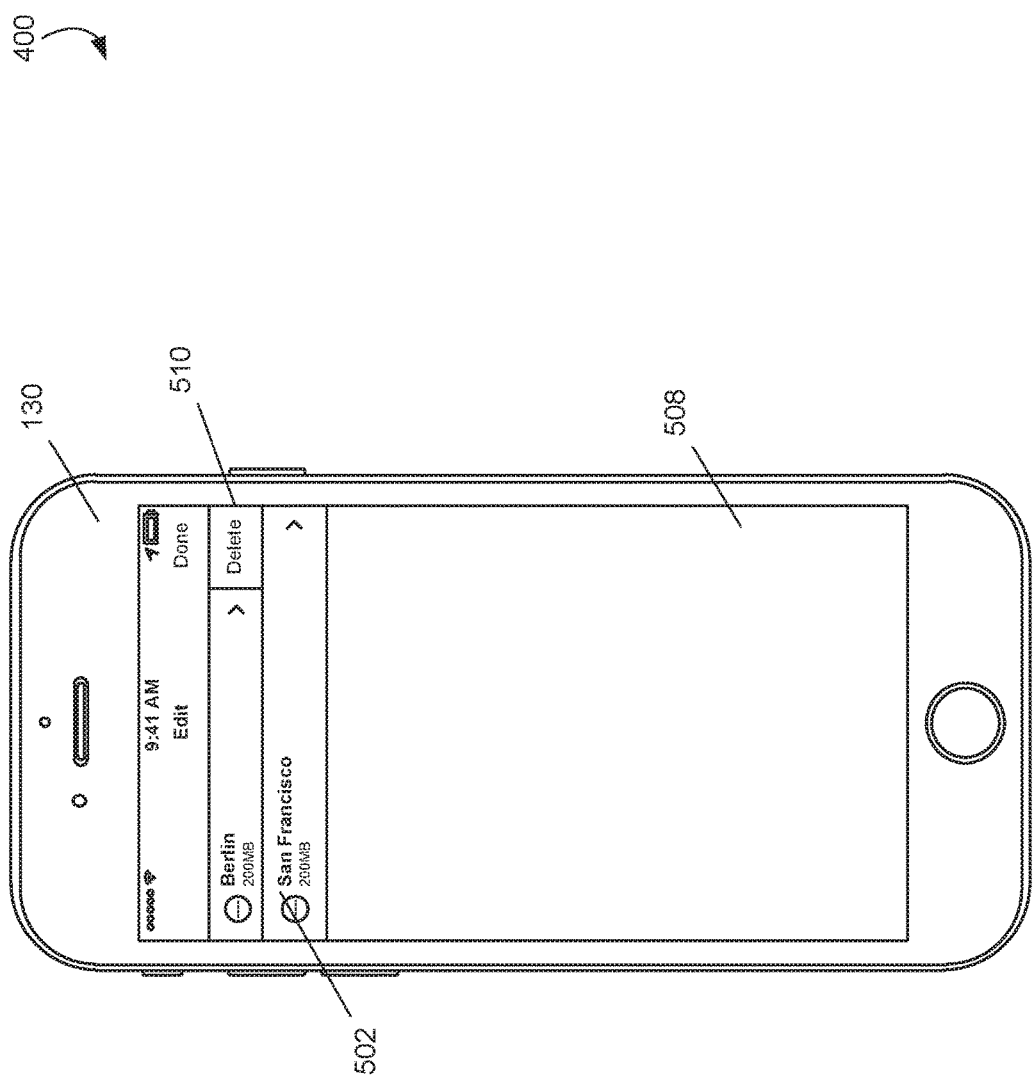
FIG. 5B shows an example map application data removal interface.

In some implementations, map UI 400 can provide a specific interface for deleting maps. For example, user may be able to click edit object 506, which can cause map UI 400 to display a data removal interface. FIG. 5B shows data removal interface 508, which can be a specific UI within the general map UI 400. User may be able to click on map listing 502, causing delete object 510 to appear. The user can click delete object 510 to cause map application 134 to delete the selected map data from map data database 136

Figure 6A:
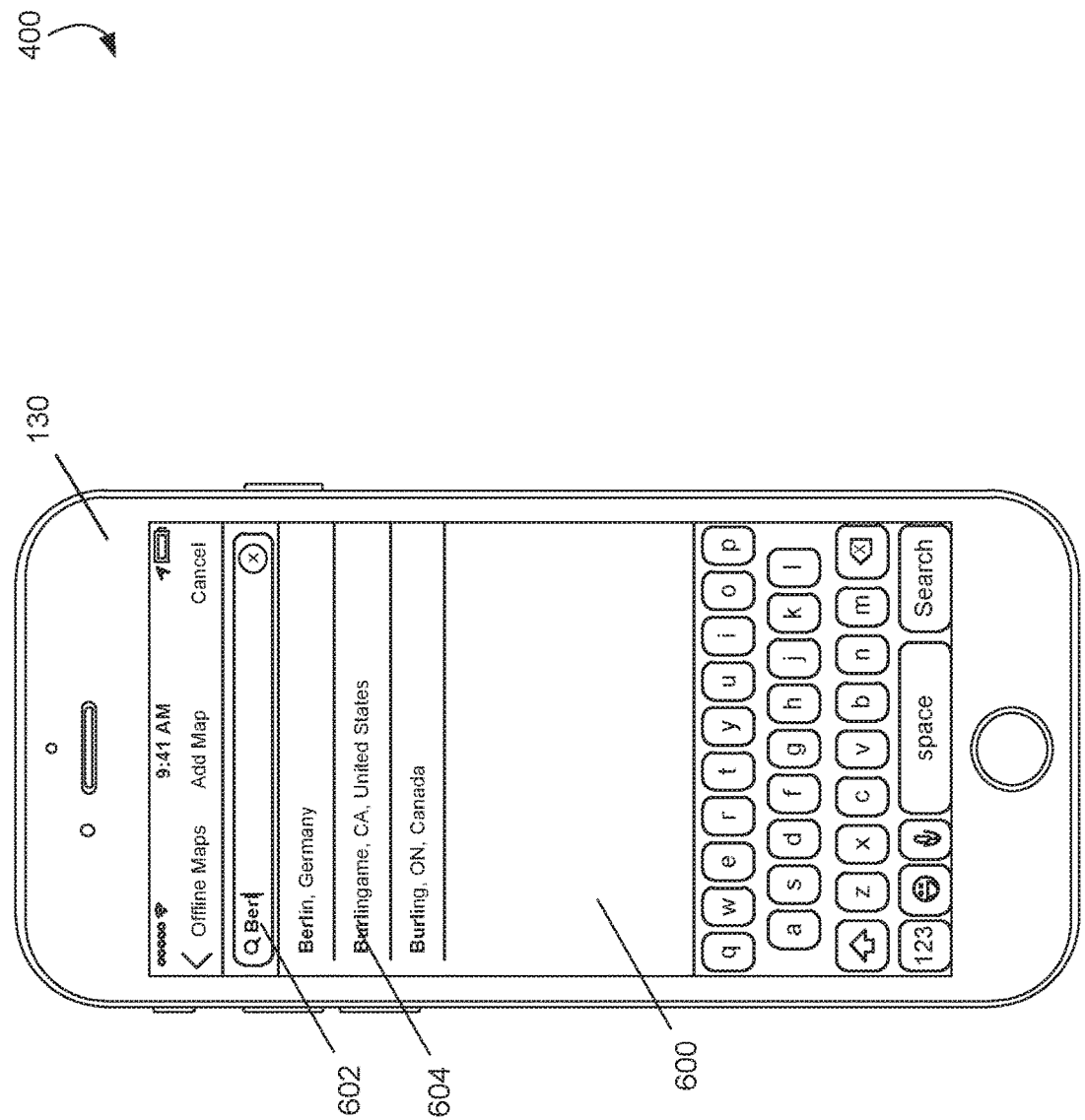
FIGS. 6A-6B show an example map application search interface.
Figure 6B:
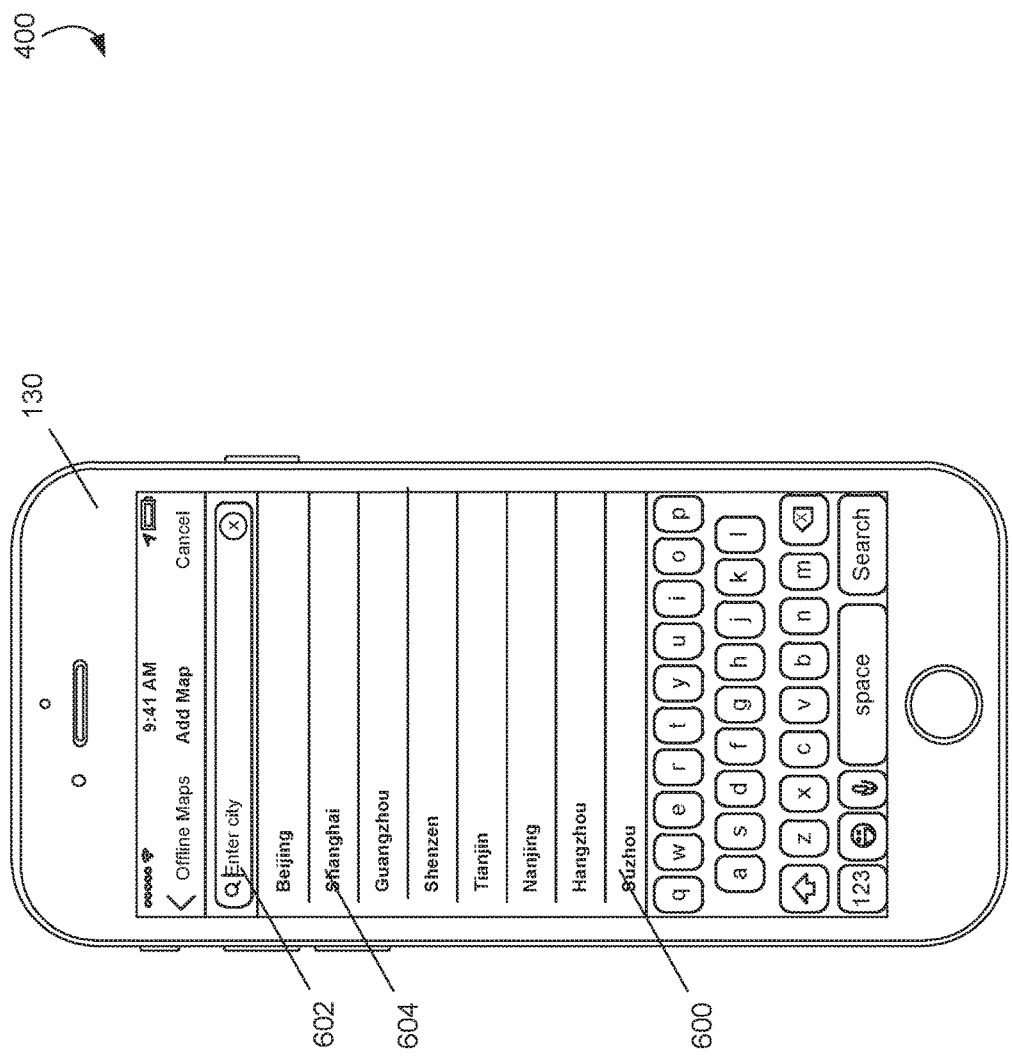

In some implementations, map UI 400 can provide an interface allowing users to search for available maps to download. For example, FIGS. 6A-6B show search interface 600, which can be a specific UI within the general map UI 400. The user can enter information into search object 602. Map application 134 can send the entered information to map service 104 of server device 102. Map service 104 can return matching offline map names from map data database 106 to user device 130. Map application 134 can display matching names 604 in search interface 600. As shown in FIG. 6A, matching names 604 can be displayed as the user types. As the user enters each letter, map application 134 can update map service 104, and map service 104 can return updated matching names 604.

In some implementations, map application 134 can send location data from location module 138 and/or data gathered by data collection module 140 as described above along with user-entered information. Accordingly, map service 104 can return results in order of relevance to the location information. For example, in FIG. 6A, user device 130 may be in or near Berlin, Germany as the search is being conducted. In some implementations, this feature may enable map application 134 to pre-populate matching names 604. In another example, as shown in FIG. 6B, user device 130 may be in China when the user opens search interface 600. Map application 134 can send user device 130 location to map service 104, and map service 104 can return names of major Chinese cities as names 604 for display by map application 134. As shown, names 604 can be displayed before the user enters information into search object 602.

In some implementations, map application 134 can return names 604 related to a search query but not matching the search query. For example, a user may enter a region that is too large or too small to be in map data database 106, such as "Texas." In this case, map service 104 can identify and return results relevant to the search query but not containing the terms of the search query, such as the names of major cities in Texas.

Figure 7A:
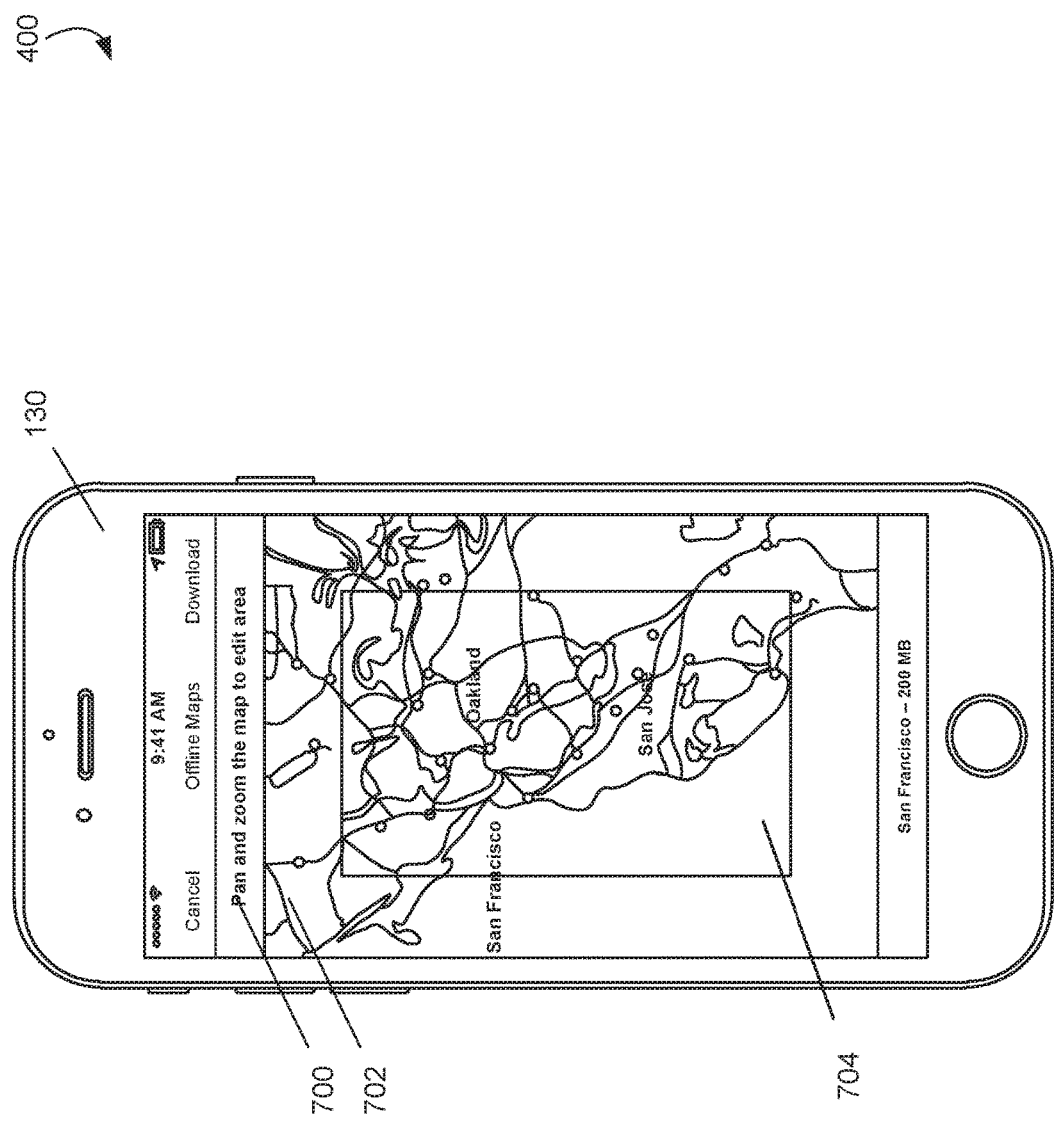
FIGS. 7A-7B show an example map application editing interface.
Figure 7B:
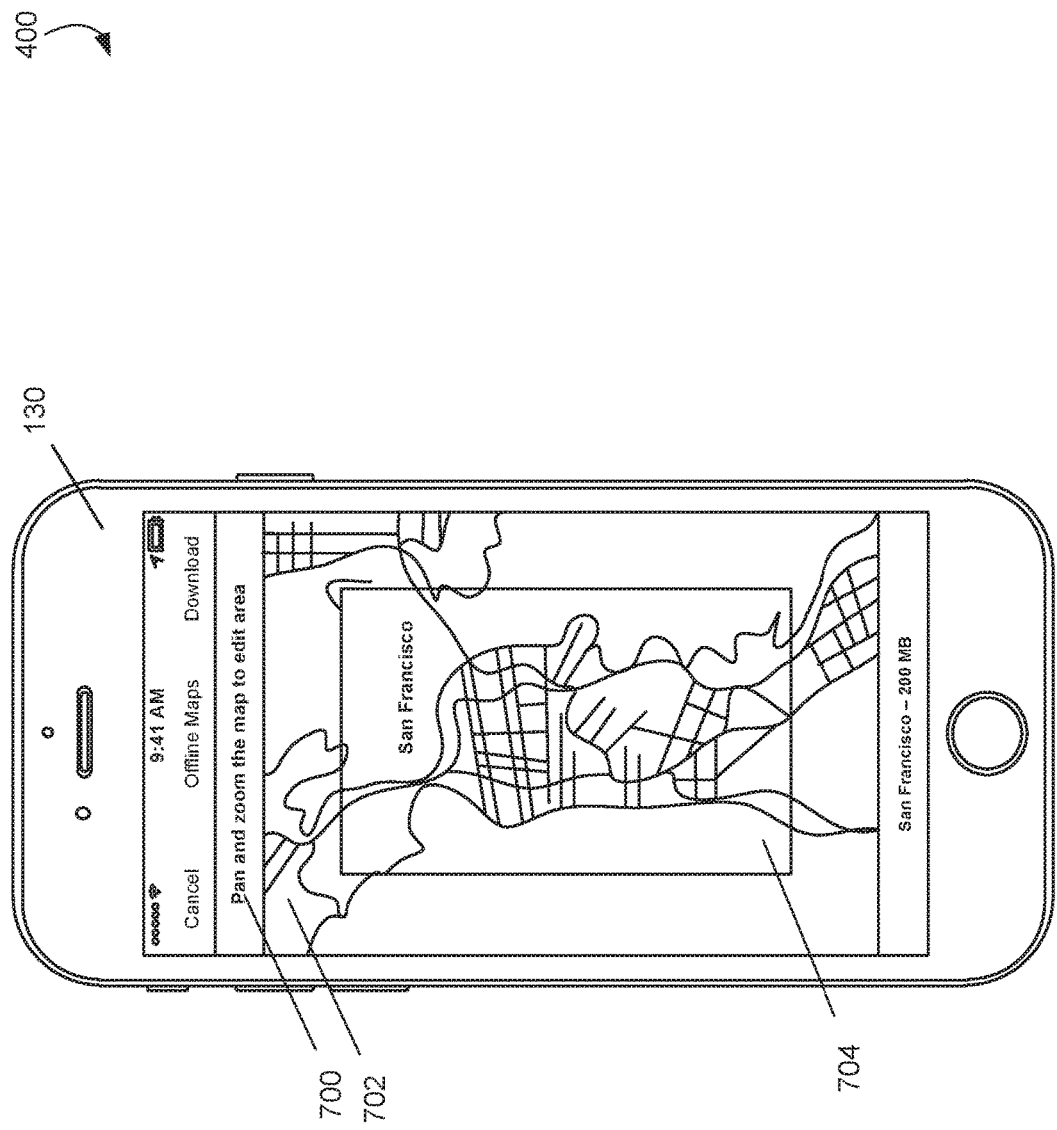

In some implementations, map application 134 can download predefined maps by default but allow a user to edit the maps before and/or after download. For example, FIGS. 7A-7B show editing interface 700, which can be a specific UI within the general map UI 400. Map application 134 can display editing interface 700 prior to downloading offline map data or in response to user command after the offline map data has been downloaded. Editing interface 700 can include map 702 and map overlay 704. Map overlay 704 can represent the area covered by the offline map data. The user may be able to drag and zoom map 702 but may be unable to modify the size and shape of map overlay 704. For example, as seen by comparing FIGS. 7A and 7B, a user can go from a zoomed out map 702 of the Bay Area centered approximately on the San Mateo Bridge to a zoomed in map 702 of San Francisco centered on the city, but the size and shape of map overlay 704 remains consistent. Map application 134 can request the map data corresponding to the selected map overlay 704 for download.

In some implementations, map application 134 can download updates to offline maps stored on user device 130. For example, map application 134 can check map service 104 for updates every night as long as user device 130 is connected to a power source and a WiFi network. Map application 134 may refrain from updating offline maps when user device 130 is not connected to a power source and/or a WiFi network to avoid excessive battery drain or cellular data usage.

Figure 8A:
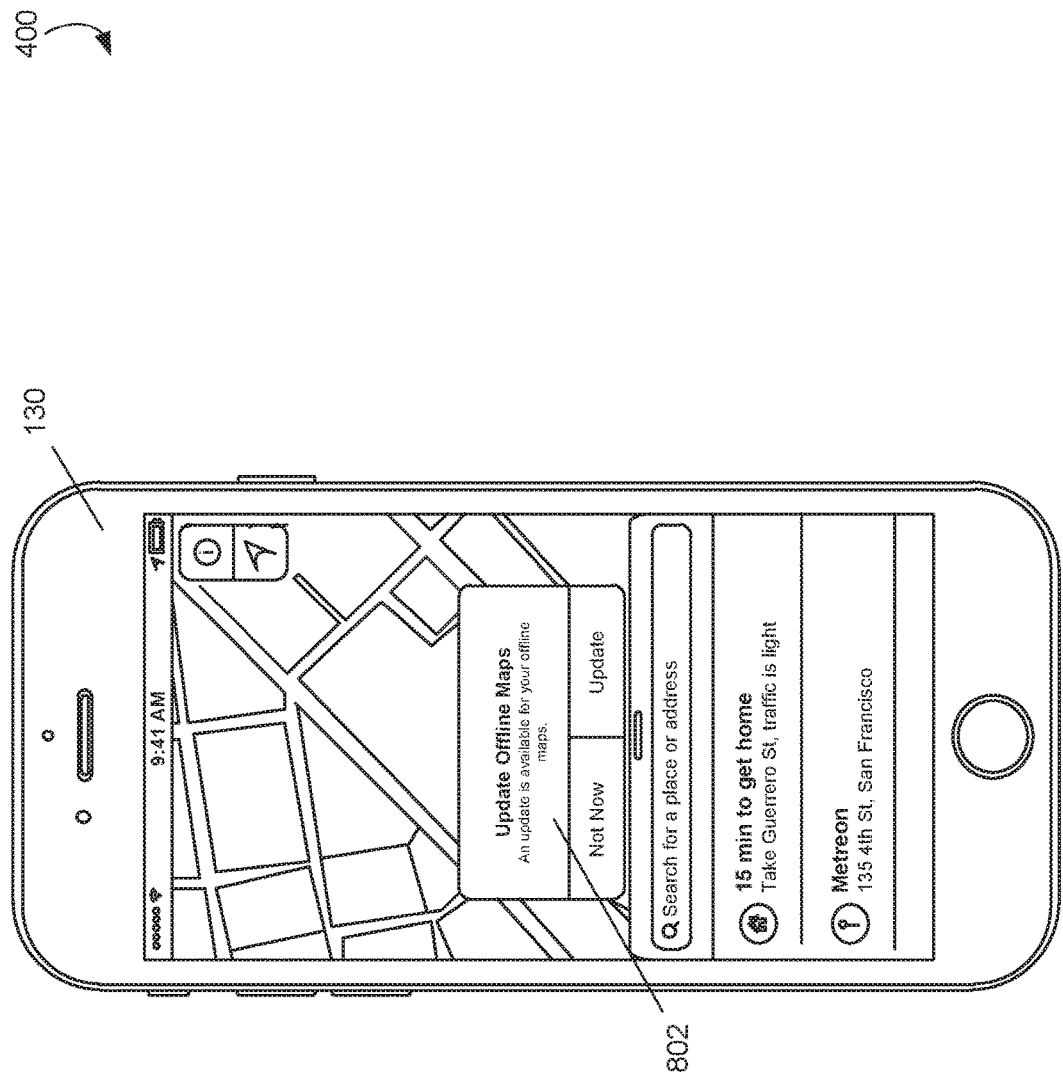
FIG. 8A shows an example map update interface.
Figure 8B:
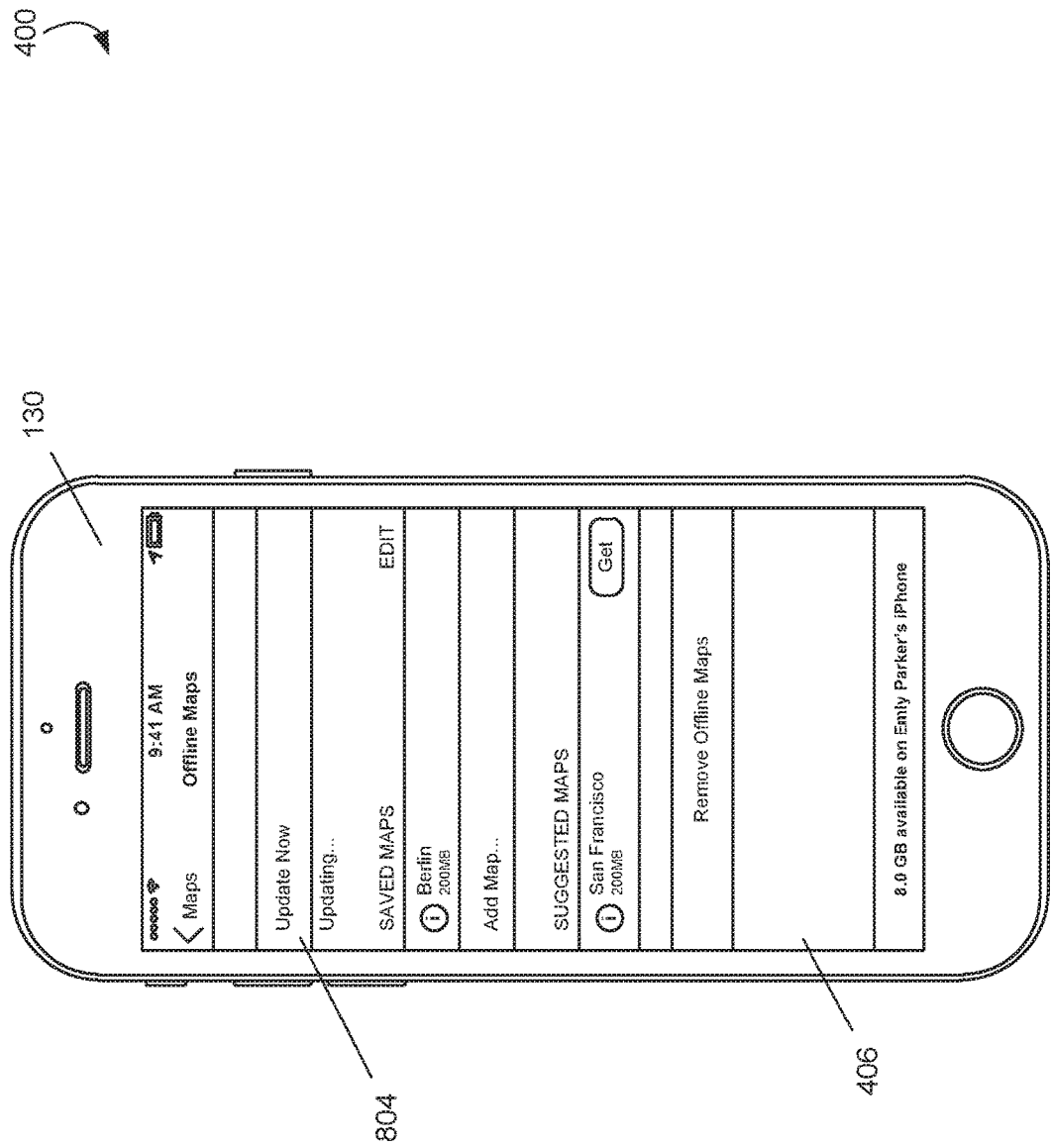
FIG. 8B shows an example map application settings interface.

In some cases, user device 130 may be unable to satisfy the conditions for updating offline maps for an extended period of time. For example, a user may only charge user device 130 during the day, the user may not connect user device 130 to a WiFi network overnight, or the user may power down user device 130 overnight. To allow the user to obtain updates in these situations, user device 130 can present map update interface 802 of FIG. 8A in map UI 400. For example, after a predefined time elapses without updating offline map data (e.g., one week), map application 134 can display map update interface 802 upon map application 134 startup. In another example, map service 104 can report an available update to map application 134, and map application 134 can display map update interface 802 in response. When updates are available, map application settings interface 406 can include map update object 804, as shown in FIG. 8B. The user can select map update interface 802 or map update object 804 to cause map application 134 to download offline map data updates from map service 104.

Figure 9A:
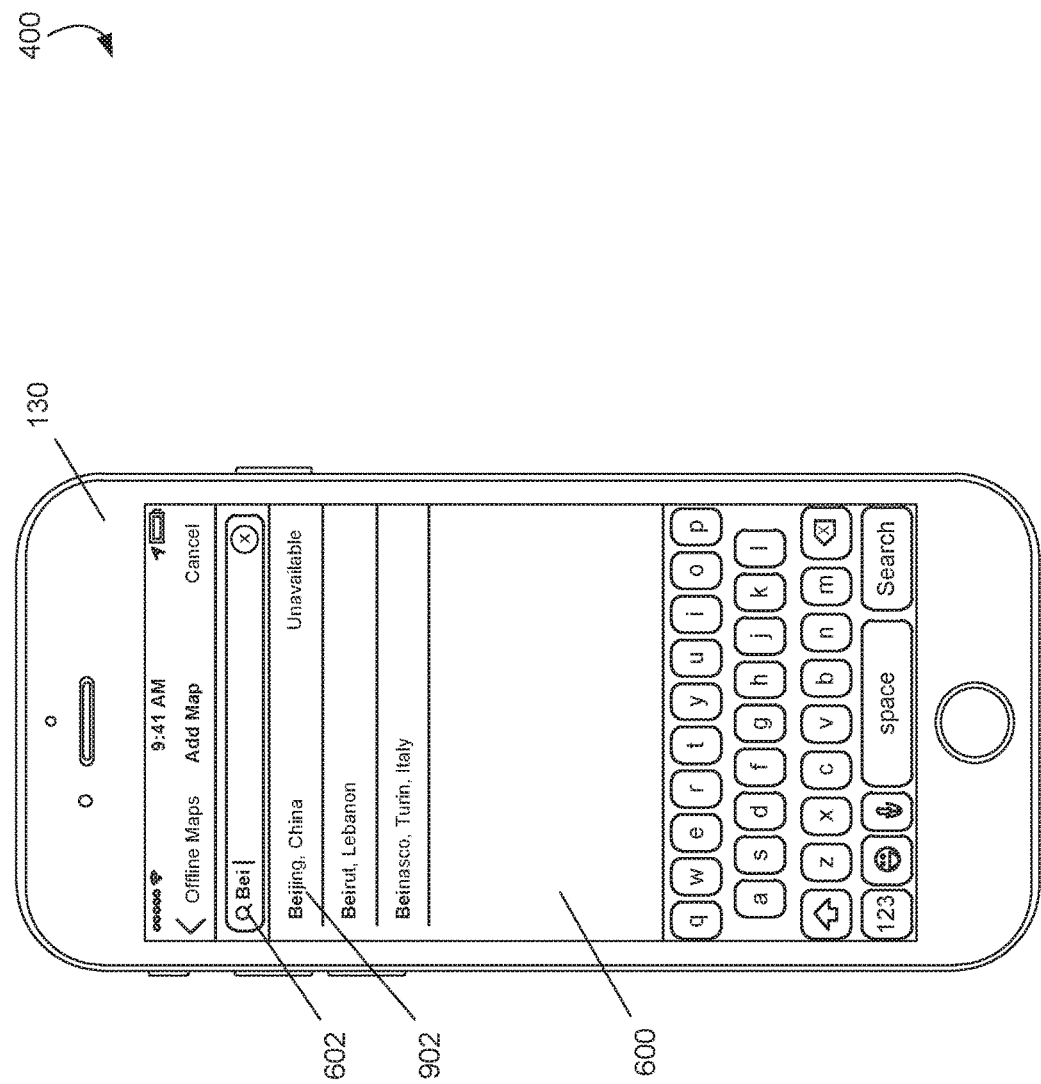
FIG. 9A shows an example map application search interface.

In some cases, offline map data relevant to a user request or related to user device 130 location data may be unavailable for download from map service 104. For example, offline map data for a specific location may be temporarily unavailable, permanently unavailable, or restricted for download by a particular user device 130 or when user device 130 is in a particular location. In this case, map UI 400 can present the location as a known but unavailable location (e.g., grayed-out location listing 902 of FIG. 9A) or refrain from providing an option to download the data (e.g., compare map interface 410 of FIG. 9B with map interface 410 of FIG. 9C, which includes suggestion 412).

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 10:
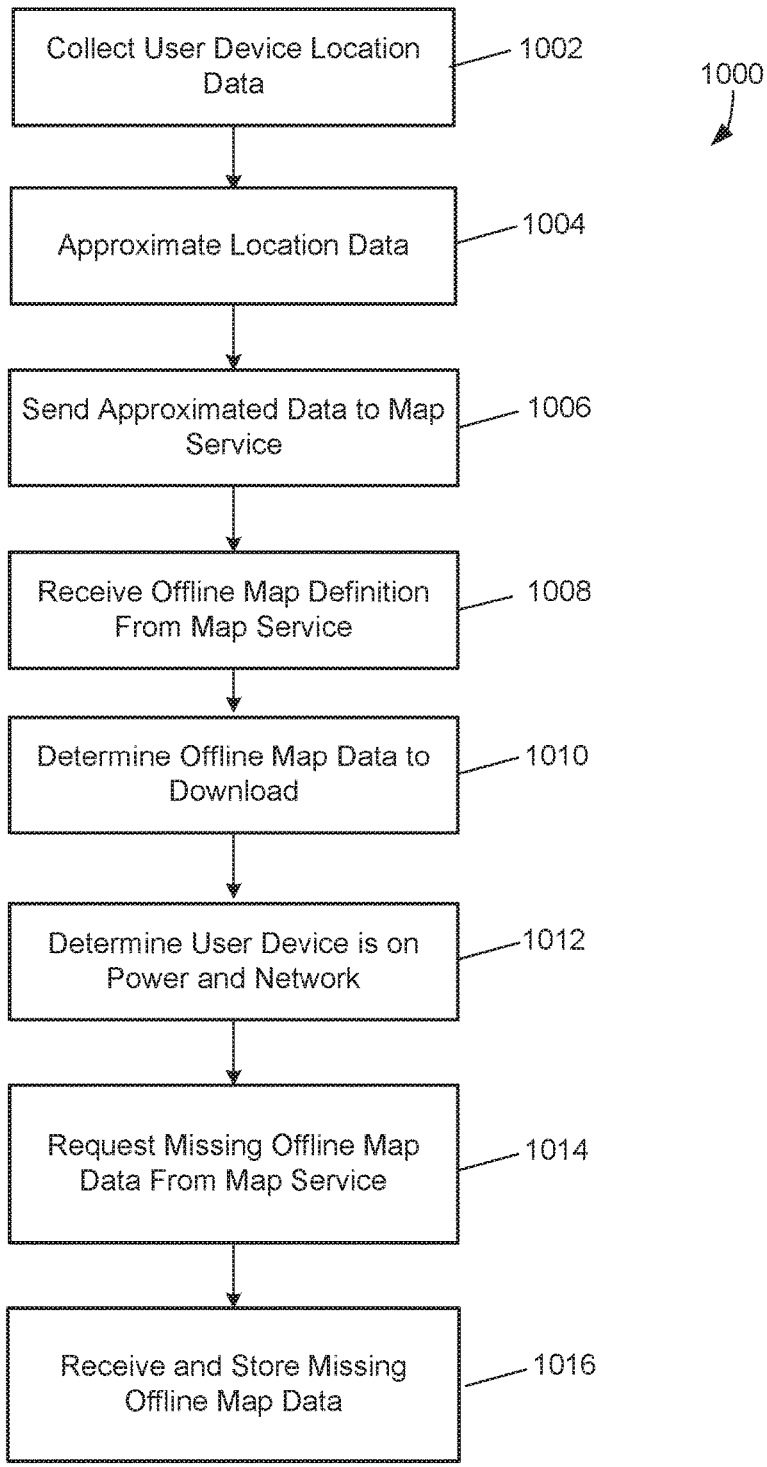
FIG. 10 is a flow diagram of an example process for proactively downloading offline map data.

FIG. 10 is a flow diagram of an example process 1000 for proactively downloading offline map data. Process 1000 can be performed by one or more elements of user device 130. For example, process 1000 can be performed by offline map module 132, location module 138, and/or data collection module 140 of user device 130. Process 1000 can be performed periodically (e.g., once a week). Process 1100, which can be performed by server device 102 in coordination with process 1000, is described below.

At step 1002, data collection module 140 can collect user device 130 location data. For example, data collection module 140 can collect location data generated by location module 138. Data collection module 140 can collect current readings by location module 138 indicating a current location of user device 130. Data collection module 140 can store location module 138 readings in collected data database 142 to build a historical record of user device locations 130. Data collection module 140 can collect user-entered location data, for example data entered by a user interacting with user device 130 applications. User-entered data can include location search data, user-defined locations such as home and office, appointment or reservation data for events at specific locations, etc.

At step 1004, offline map module 132 can approximate location data gathered by data collection module 140. For example, offline map module 132 can identify at least a subset of location data in collected data database 142 and/or current location data from location module 138 as identifying one or more relevant locations. Relevant locations can include current location, home location, office location, school location, favorite locations to visit, locations of future appointments or reservations, etc. Offline map module 132 can form approximations for individual relevant locations or groups of relevant locations. For example, offline map module 132 can approximate relevant locations by truncating or rounding latitude and longitude degrees or by grouping locations and identifying a centroid of the group.

At step 1006, offline map module 132 can send approximated relevant locations to map service 104 of server device 102. For example, offline map module 132 can use networking hardware and software of user device 130 to communicate with server device 102 through a cellular or WiFi connection to the Internet or other network 150.

At step 1008, offline map module 132 can receive data from server device 102 in response to the approximated relevant locations sent by map service 104. For example, the response can include an offline map definition. The offline map definition can define boundaries of one or more offline map data areas that contain the approximated relevant locations. For example, an offline map data area may be a square or other polygon extended out a set distance from an approximated location in several directions. The offline map definition can express the offline map data area using coordinates, such as coordinates for opposite corners of a square.

At step 1010, offline map module 132 can determine whether it should download offline map data from server device 102. For example, offline map module 132 can check map data database 136 to determine whether some or all of the offline map data within the offline map definition area is already stored therein. If data for any portion of the offline map definition area is missing from map data database 136, offline map module 132 can formulate a request for the missing data. For example, offline map module 132 can identify missing quadtree nodes and generate a request indicating the missing nodes.

At step 1012, offline map module 132 can determine whether user device 130 is connected to a power source and a WiFi network. To avoid excessive battery drain and/or cellular data usage, offline map module 132 can wait for user device 130 to be on power and WiFi before proceeding with process 1000.

At step 1014, offline map module 132 can automatically request the missing map data from map service 104 of server device 102 in response to determining user device 130 is connected to a power source and a WiFi network. For example, offline map module 132 can use networking hardware and software of user device 130 to communicate with server device 102 through a cellular or WiFi connection to the Internet or other network 150.

At step 1016, offline map module 132 can receive data from server device 102 in response to the sent map data request. For example, the response can include the requested offline map data. Offline map module 132 can add the offline map data to map data database 136. Offline map data in map data database 136 may be useable by map application 134 when user device 130 has poor or no network connectivity, for example.

Figure 11:
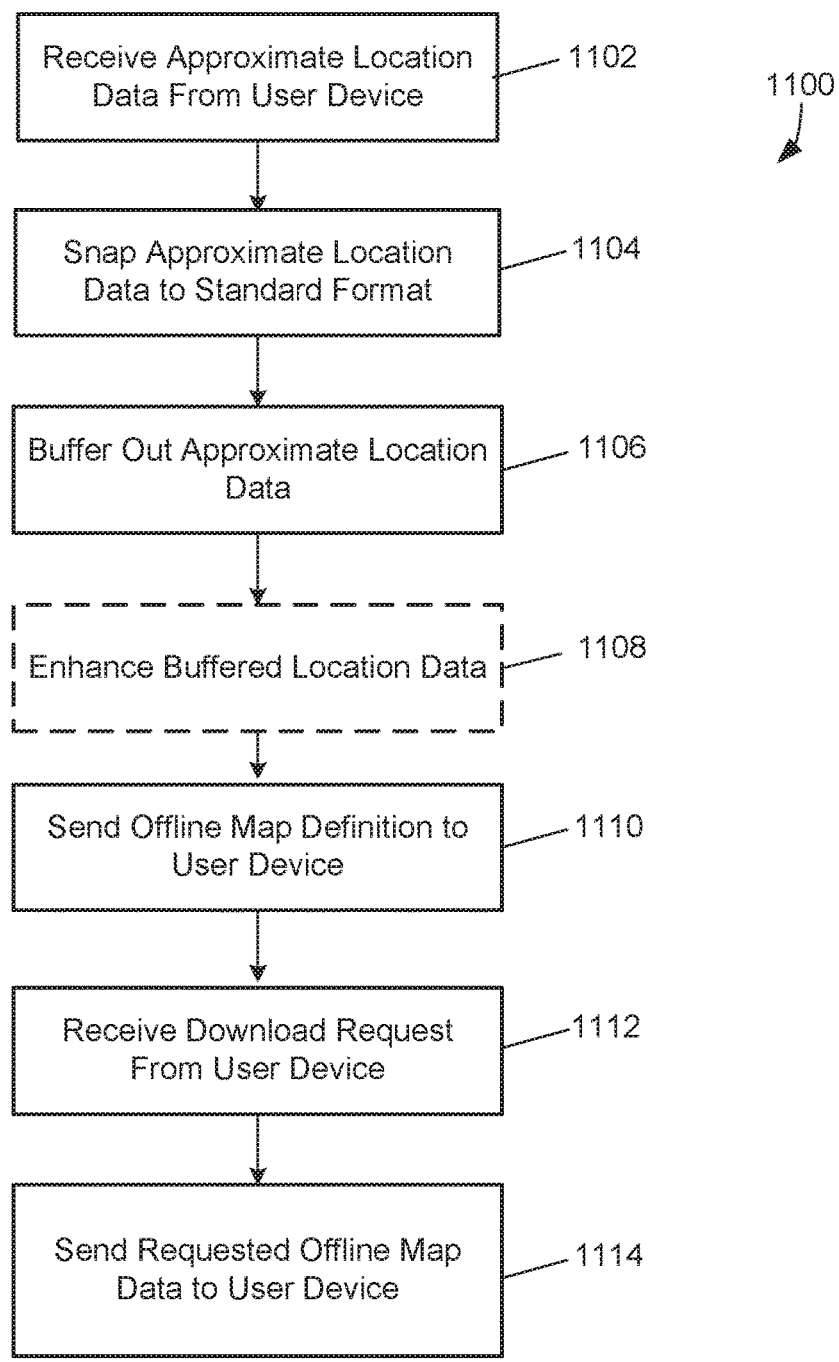
FIG. 11 is a flow diagram of an example process for sending proactively requested offline map data.

FIG. 11 is a flow diagram of an example process 1100 for sending proactively requested offline map data. For example, process 1100 can be performed by map service 104 of server device 102. Process 1100 can be triggered by user device 130 performing process 1000 and thereby sending data to server device 102. Process 1000, which can be performed by user device 130 in coordination with process 1100, is described above.

At step 1102, map service 104 can receive approximate location data from user device 130. For example, map service 104 can receive the approximate location data through network 150. The approximate location data may have been sent by user device 130 at step 1006 of process 1000.

At step 1104, map service 104 can snap the approximate location data to a standard format. For example, a location approximation can be moved to snap to a grid or quadtree so that an offline map area ultimately generated by map service 104 corresponds to a preset downloadable portion of map data. For example, map service 104 can snap approximations to a grid of a known size (e.g., 1 kilometer square grid structure) or quadtree of a known level (e.g., 1 kilometer square node level).

At step 1106, map service 104 can extend the approximate location data to generate an offline map data area for download by user device 130. The resulting offline map data area can include the approximate location and the surrounding area. For example, map service 104 can define a polygon (e.g., square) surrounding the approximate location. Map service 104 can extend out a predetermined distance from the approximate location in a plurality of directions (e.g., for a square, four directions) and define a polygon encompassing the extended area. For example, an approximation can represent 1 square kilometer, and server device 102 can extend out 25 kilometers in each direction, resulting in a 51 square kilometer offline map area.

At step 1108, map service 104 can enhance the extended area to include additional areas that may be relevant to the approximate location data. In some cases, step 1108 is not performed, but in other cases, map service 104 can determine that the extended area still does not include enough area to be entirely responsive to the request from user device 130. For example, the approximate location data can include two approximate locations that are far apart from one another and joined by frequently-used connecting routes (e.g., highways) that are not fully contained within the extended area. To capture this space, map service 104 can extend a first offline map area to contact the other offline map area so that the entire commute route is included in the offline map area definition. In another example, an extended area can include nearly all of a coherent municipality or other predefined real-world area and can be extended out further to include the entire real-world area.

At step 1110, map service 104 can send the offline map area definition to user device 130. For example, map service 104 can send the offline map area definition through network 150. As noted above, user device 130 can process the offline map area definition and send a download request if needed (see steps 1008-1014 of process 1000).

At step 1112, map service 104 can receive the download request from user device 130. For example, map service 104 can receive the download request through network 150. The download request may have been sent by user device 130 at step 1014 of process 1000. The download request can indicate a missing portion of the offline map area (e.g., one or more quadtree nodes).

At step 1114, map service 104 can send the requested map data to user device 130. For example, map service 104 can find the requested map data in map data database 106 and send the requested map data through network 150.

Figure 12:
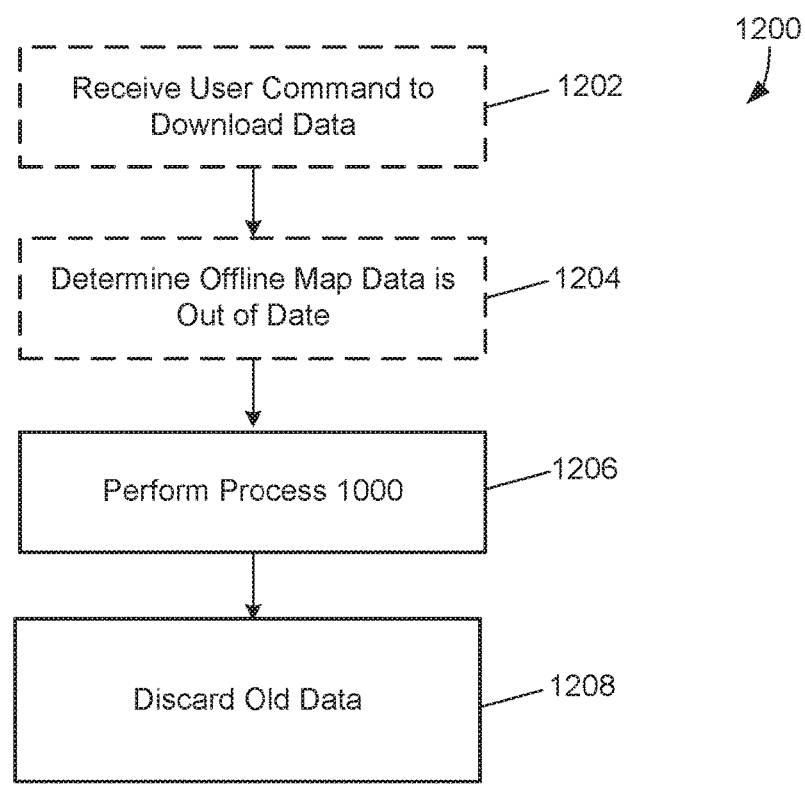
FIG. 12 is a flow diagram of an example process for updating offline map data.

FIG. 12 is a flow diagram of an example process 1200 for updating offline map data. Process 1200 can be performed by one or more elements of user device 130. For example, process 1200 can be performed by offline map module 132, map application 134, location module 138, and/or data collection module 140 of user device 130. Process 1200 can be performed periodically (e.g., once a week) and/or when user device 130 has not performed process 1200 for a predetermined length of time. For example, if user device 130 has been unable to perform process 1200 at a regularly scheduled time for more than a week (e.g., because it is powered down, not connected to a power source, or not connected to WiFi at that time), user device 130 can perform process 1200 upon connecting to a power source and a WiFi network.

At step 1202, offline map module 132 can receive a user command to download an update to the offline map data in map data database 136. For example, while process 1200 can be triggered automatically as described above, map application 134 can also provide a UI allowing a user to request an update.

At step 1204, offline map module 132 can determine that the offline map data in map data database 136 is out of date. For example, offline map module 132 can determine that it has been more than a predetermined time (e.g., one week) since process 1400 has been performed. In another example, offline map module 132 can determine that the offline map data in map data database 136 is older than a predefined age (e.g., one week old). If updating process 1200 was initiated by a user command to update the data at step 1202, step 1204 can be omitted.

At step 1206, user device 130 can request offline map data updates. For example, user device 130 can perform process 1000 of FIG. 10 to obtain updated offline map data.

At step 1208, offline map module 132 can remove old data from map data database 136. During the period of time after which the offline map data in map data database 136 was obtained, data collection module 140 may have continued to collect location data and store the location data in collected data database 142. If the locations in collected data database 142 correspond with offline map locations in map data database 136, the corresponding offline map locations may still be valid. However, if some of the offline map locations in map data database 136 no longer correspond with any location data in collected data database 142, the non-corresponding offline map locations may be invalid and can be discarded. For example, if a user has moved, changed jobs, or traveled for an extended period of time, previously acquired offline map data may no longer be relevant. Accordingly, any map data in map data database 136 that was not received at step 1206 can be discarded. In some implementations, user device 130 can also delete oldest data in map data database 136 to free up user device 130 memory for other uses. User device 130 may only delete proactively downloaded data, preserving user-requested offline map data.

Figure 13:
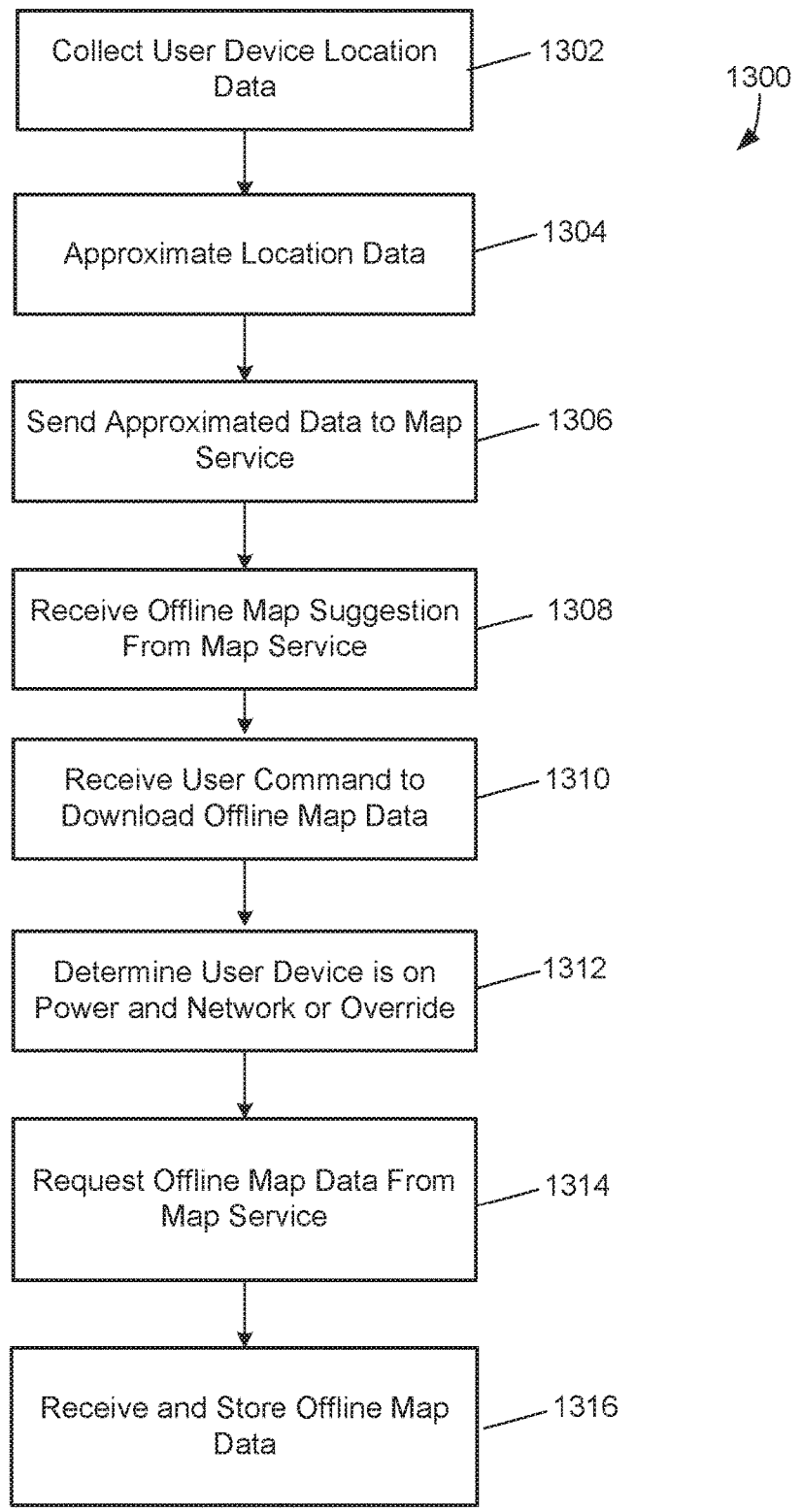
FIG. 13 is a flow diagram of an example process for suggesting and downloading offline map data.

FIG. 13 is a flow diagram of an example process 1300 for suggesting and downloading offline map data. Process 1300 can be performed by one or more elements of user device 130. For example, process 1300 can be performed by offline map module 132, map application 134, location module 138, and/or data collection module 140 of user device 130. Process 1500, which can be performed by server device 102 in coordination with process 1300, is described below.

At step 1302, data collection module 140 can collect user device 130 location data. For example, data collection module 140 can collect location data generated by location module 138. Data collection module 140 can collect current readings by location module 138 indicating a current location of user device 130. Data collection module 140 can store location module 138 readings in collected data database 142 to build a historical record of user device locations 130. Data collection module 140 can collect user-entered location data, for example data entered by a user interacting with user device 130 applications. User-entered data can include location search data, user-defined locations such as home and office, appointment or reservation data for events at specific locations, etc.

At step 1304, offline map module 132 can approximate location data gathered by data collection module 140. For example, offline map module 132 can identify at least a subset of location data in collected data database 142 and/or current location data from location module 138 as identifying one or more relevant locations. Relevant locations can include current location, home location, office location, school location, favorite locations to visit, locations of future appointments or reservations, etc. Offline map module 132 can form approximations for individual relevant locations or groups of relevant locations. For example, offline map module 132 can approximate relevant locations by truncating or rounding latitude and longitude degrees or by grouping locations and identifying a centroid of the group.

At step 1306, offline map module 132 can send approximated relevant locations to map service 104 of server device 102. For example, offline map module 132 can use networking hardware and software of user device 130 to communicate with server device 102 through a cellular or WiFi connection to the Internet or other network 150.

At step 1308, offline map module 132 can receive data from server device 102 in response to the sent approximated relevant locations. The response can include one or more suggestions of preset offline maps that may be available for download and that may be relevant to the approximated relevant locations. For example, if user device 130 is frequently located in the Washington, D.C. area, the suggestions may include a map of Washington, D.C. If calendar data sent by user device 130 indicates that the user has several events scheduled for the near future in Baltimore, the suggestions may include a map of Baltimore.

At step 1310, offline map module 132 can receive a user command to download one or more of the suggested maps. For example, offline map module 132 can cause map application 134 to display the suggestions and provide a UI allowing the user to select suggested maps for download.

At step 1312, offline map module 132 can determine whether user device 130 is connected to a power source and a WiFi network. To avoid excessive battery drain and/or cellular data usage, offline map module 132 can wait for user device 130 to be on power and WiFi before proceeding with process 1300. In some implementations, map application 134 can provide a UI allowing the user to override waiting and download offline map data despite user device 130 being disconnected from the power source and/or the WiFi network. In this case, offline map module 132 can proceed with process 1300 upon receiving an override command.

At step 1314, offline map module 132 can request the offline map data from map service 104 of server device 102. For example, offline map module 132 can use networking hardware and software of user device 130 to communicate with server device 102 through a cellular or WiFi connection to the Internet or other network 150.

At step 1316, offline map module 132 can receive data from server device 102 in response to the sent map data request. For example, the response can include the requested offline map data. Offline map module 132 can add the offline map data to map data database 136. Offline map data in map data database 136 may be useable by map application 134 when user device 130 has poor or no network connectivity, for example.

Figure 14:
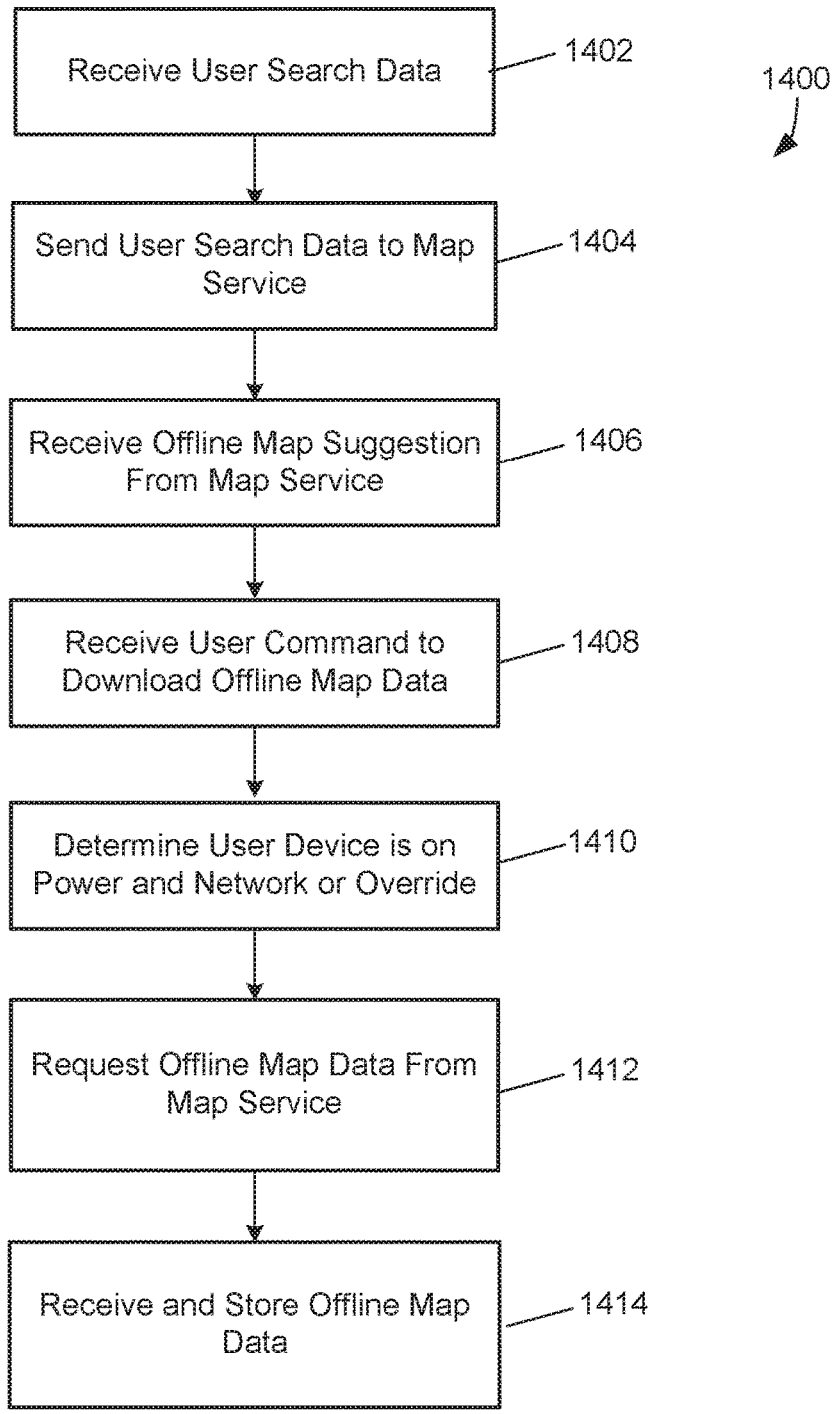
FIG. 14 is a flow diagram of an example process for downloading offline map data in response to a search.

FIG. 14 is a flow diagram of an example process 1400 for downloading offline map data in response to a search. Process 1400 can be performed by one or more elements of user device 130. For example, process 1400 can be performed by offline map module 132, map application 134, location module 138, and/or data collection module 140 of user device 130. Process 1500, which can be performed by server device 102 in coordination with process 1400, is described below.

At step 1402, offline map module 132 can receive user search data. For example, map application 134 can include a search UI allowing a user to search for offline map locations. A user may enter a search term, triggering process 1400. In some implementations, process 1400 may repeat as the user adds characters to the search term, allowing for search results to appear before the user is done typing (e.g., an autocomplete feature).

At step 1404, offline map module 132 can send user search data to map service 104 of server device 102. For example, offline map module 132 can use networking hardware and software of user device 130 to communicate with server device 102 through a cellular or WiFi connection to the Internet or other network 150.

At step 1406, offline map module 132 can receive data from server device 102 in response to the sent user search data. The response can include one or more suggestions of preset offline maps that may be available for download and that may be relevant to the user search data. For example, if the user has typed "Cal," the response can include "Calcutta, West Bengal, India" and "Calgary, Alberta, Canada." If the user has typed "Calg," the response may only include Calgary. In some implementations, offline map module 132 can order the results to correspond to data in collected data database 142. For example, if collected data database 142 contains a stored home location in or near Calgary and/or several frequently visited locations in or near Calgary, Calgary can appear above Calcutta despite coming after Calcutta alphabetically.

At step 1408, offline map module 132 can receive a user command to download one or more of the suggested maps. For example, offline map module 132 can cause map application 134 to display the results and provide a UI allowing the user to select maps in the results for download.

At step 1410, offline map module 132 can determine whether user device 130 is connected to a power source and a WiFi network. To avoid excessive battery drain and/or cellular data usage, offline map module 132 can wait for user device 130 to be on power and WiFi before proceeding with process 1400. In some implementations, map application 134 can provide a UI allowing the user to override waiting and download offline map data despite user device 130 being disconnected from the power source and/or the WiFi network. In this case, offline map module 132 can proceed with process 1400 upon receiving an override command.

At step 1412, offline map module 132 can request the offline map data from map service 104 of server device 102. For example, offline map module 132 can use networking hardware and software of user device 130 to communicate with server device 102 through a cellular or WiFi connection to the Internet or other network 150.

At step 1414, offline map module 132 can receive data from server device 102 in response to the sent map data request. For example, the response can include the requested offline map data. Offline map module 132 can add the offline map data to map data database 136. Offline map data in map data database 136 may be useable by map application 134 when user device 130 has poor or no network connectivity, for example.

Figure 15:
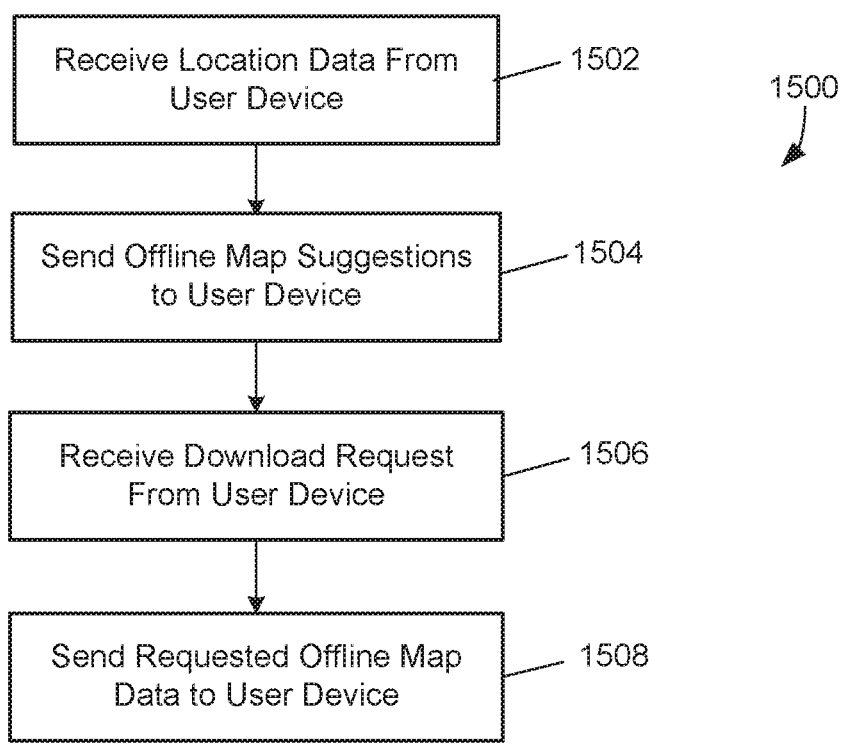
FIG. 15 is a flow diagram of an example process for sending requested offline map data.

FIG. 15 is a flow diagram of an example process 1500 for sending requested offline map data. For example, process 1500 can be performed by map service 104 of server device 102. Process 1500 can be triggered by user device 130 performing process 1300 or 1400 (both described above) and thereby sending data to server device 102.

At step 1502, map service 104 can receive location data from user device 130. For example, map service 104 can receive the location data through network 150. The location data may have been sent by user device 130 at step 1306 of process 1300 or step 1404 of process 1400.

At step 1504, map service 104 send offline map suggestions to user device 130. For example, map service 104 can use approximate locations sent by user device at step 1306 of process 1300 to identify possibly relevant maps the user may wish to download based on the approximate locations (e.g., maps containing the approximate locations). In another example, map service 104 can match search data sent by user device at step 1404 of process 1400 to names of maps in map data database 106. Map service 104 can send the offline map area definition through network 150.

At step 1506, map service 104 can receive a download request from user device 130. For example, map service 104 can receive the download request through network 150. The download request may have been sent by user device 130 at step 1314 of process 1300 or step 1412 of process 1400. The download request can indicate one or more selected preset offline maps for download.

At step 1508, map service 104 can send the requested map data to user device 130. For example, map service 104 can find the requested map data in map data database 106 and send the requested map data through network 150.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 16:
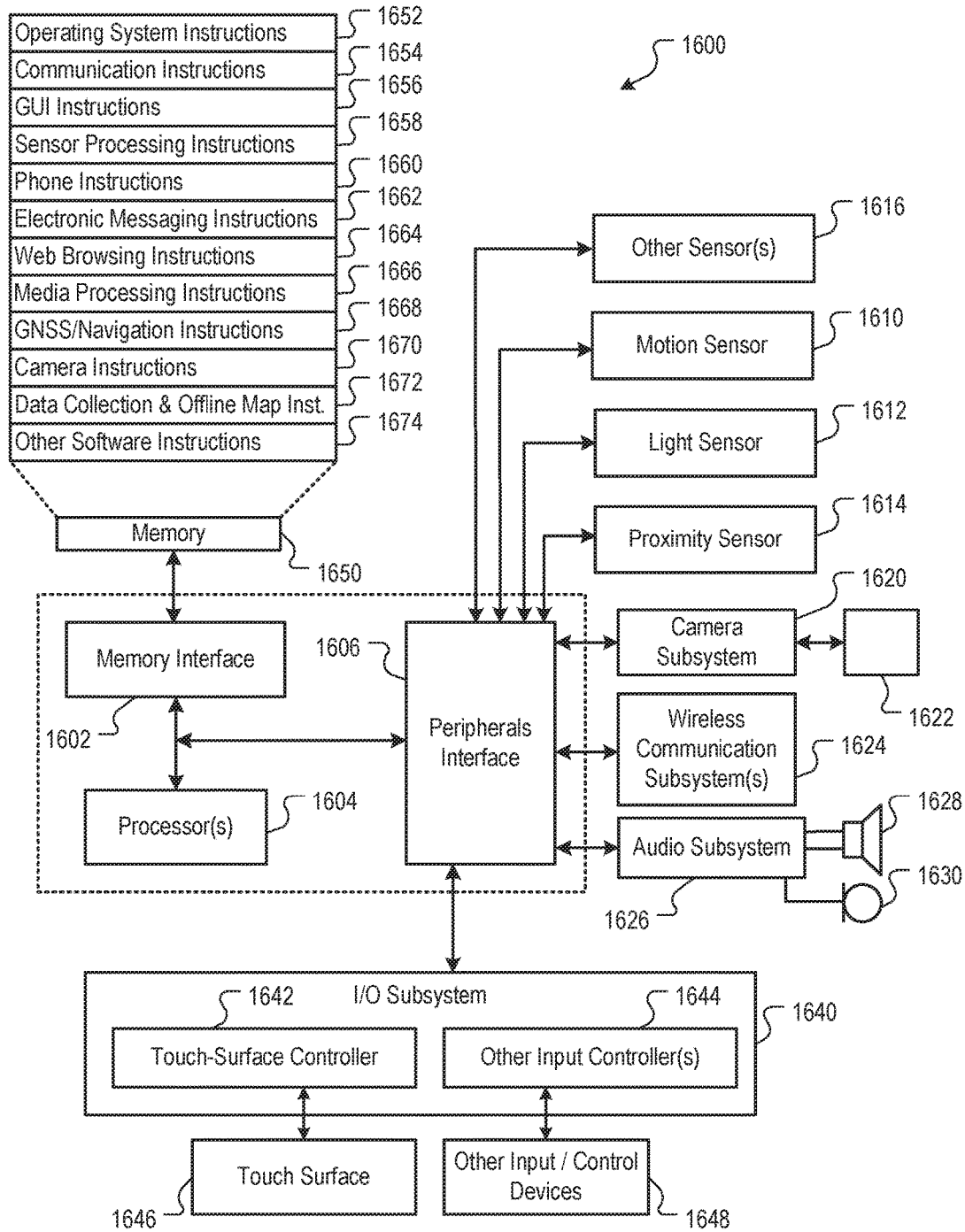
FIG. 16 is a block diagram of an example computing device that can implement the features and processes of FIGS. 1-15.

FIG. 16 is a block diagram of an example computing device 1600 that can implement the features and processes of FIGS. 1-15. The computing device 1600 can include a memory interface 1602, one or more data processors, image processors and/or central processing units 1604, and a peripherals interface 1606. The memory interface 1602, the one or more processors 1604, and/or the peripherals interface 1606 can be separate components or can be integrated in one or more integrated circuits. The various components in the computing device 1600 can be coupled by one or more communication buses or signal lines.

Sensors, devices, and subsystems can be coupled to the peripherals interface 1606 to facilitate multiple functionalities. For example, a motion sensor 1610, a light sensor 1612, and a proximity sensor 1614 can be coupled to the peripherals interface 1606 to facilitate orientation, lighting, and proximity functions. Other sensors 1616 can also be connected to the peripherals interface 1606, such as a global navigation satellite system (GNSS) (e.g., GPS receiver), a temperature sensor, a biometric sensor, magnetometer or other sensing device, to facilitate related functionalities.

A camera subsystem 1620 and an optical sensor 1622, e.g., a charged coupled device (CCD) or a complementary metal-oxide semiconductor (CMOS) optical sensor, can be utilized to facilitate camera functions, such as recording photographs and video clips. The camera subsystem 1620 and the optical sensor 1622 can be used to collect images of a user to be used during authentication of a user, e.g., by performing facial recognition analysis.

Communication functions can be facilitated through one or more wireless communication subsystems 1624, which can include radio frequency receivers and transmitters and/or optical (e.g., infrared) receivers and transmitters. The specific design and implementation of the communication subsystem 1624 can depend on the communication network(s) over which the computing device 1600 is intended to operate. For example, the computing device 1600 can include communication subsystems 1624 designed to operate over a GSM network, a GPRS network, an EDGE network, a Wi-Fi or WiMax network, and a Bluetooth™ network. In particular, the wireless communication subsystems 1624 can include hosting protocols such that the device 100 can be configured as a base station for other wireless devices.

An audio subsystem 1626 can be coupled to a speaker 1628 and a microphone 1630 to facilitate voice-enabled functions, such as speaker recognition, voice replication, digital recording, and telephony functions. The audio subsystem 1626 can be configured to facilitate processing voice commands, voiceprinting and voice authentication, for example.

The I/O subsystem 1640 can include a touch-surface controller 1642 and/or other input controller(s) 1644. The touch-surface controller 1642 can be coupled to a touch surface 1646. The touch surface 1646 and touch-surface controller 1642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1646.

The other input controller(s) 1644 can be coupled to other input/control devices 1648, such as one or more buttons, rocker switches, thumb-wheel, infrared port, USB port, and/or a pointer device such as a stylus. The one or more buttons (not shown) can include an up/down button for volume control of the speaker 1628 and/or the microphone 1630.

In some implementations, a pressing of the button for a first duration can disengage a lock of the touch surface 1646; and a pressing of the button for a second duration that is longer than the first duration can turn power to the computing device 1600 on or off. Pressing the button for a third duration can activate a voice control, or voice command, module that enables the user to speak commands into the microphone 1630 to cause the device to execute the spoken command. The user can customize a functionality of one or more of the buttons. The touch surface 1646 can, for example, also be used to implement virtual or soft buttons and/or a keyboard.

In some implementations, the computing device 1600 can present recorded audio and/or video files, such as MP3, AAC, and MPEG files. In some implementations, the computing device 1600 can include the functionality of an MP3 player, such as an iPod™. The computing device 1600 can, therefore, include a 36-pin connector that is compatible with the iPod. Other input/output and control devices can also be used.

The memory interface 1602 can be coupled to memory 1650. The memory 1650 can include high-speed random access memory and/or non-volatile memory, such as one or more magnetic disk storage devices, one or more optical storage devices, and/or flash memory (e.g., NAND, NOR). The memory 1650 can store an operating system 1652, such as Darwin, RTXC, LINUX, UNIX, OS X, WINDOWS, or an embedded operating system such as VxWorks.

The operating system 1652 can include instructions for handling basic system services and for performing hardware dependent tasks. In some implementations, the operating system 1652 can be a kernel (e.g., UNIX kernel). In some implementations, the operating system 1652 can include instructions for performing voice authentication. For example, operating system 1652 can implement the offline map features as described with reference to FIGS. 1-15.

The memory 1650 can also store communication instructions 1654 to facilitate communicating with one or more additional devices, one or more computers and/or one or more servers. The memory 1650 can include graphical user interface instructions 1656 to facilitate graphic user interface processing; sensor processing instructions 1658 to facilitate sensor-related processing and functions; phone instructions 1660 to facilitate phone-related processes and functions; electronic messaging instructions 1662 to facilitate electronic-messaging related processes and functions; web browsing instructions 1664 to facilitate web browsing-related processes and functions; media processing instructions 1666 to facilitate media processing-related processes and functions; GNSS/Navigation instructions 1668 to facilitate GNSS and navigation-related processes and instructions; and/or camera instructions 1670 to facilitate camera-related processes and functions.

The memory 1650 can store data collection and offline map software instructions 1672 to facilitate other processes and functions, such as the offline map processes and functions as described with reference to FIGS. 1-15.

The memory 1650 can also store other software instructions 1674, such as web video instructions to facilitate web video-related processes and functions; and/or web shopping instructions to facilitate web shopping-related processes and functions. In some implementations, the media processing instructions 1666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1650 can include additional instructions or fewer instructions. Furthermore, various functions of the computing device 1600 can be implemented in hardware and/or in software, including in one or more signal processing and/or application specific integrated circuits.

Example Features

Some implementations described above can provide at least the following features.

A method can comprise: receiving, by a map service of a computing device, data defining a relevant location from a user computing device, the data predicting the computing device will be located in the relevant location at a future time; identifying, by the map service, at least one preset map from a plurality of preset maps that corresponds to the relevant location, wherein each of the plurality of preset maps is defined to include a respective geographic or political area unit; sending, by the map service, data describing the at least one preset map to the user computing device; receiving, by the map service from the user computing device, a request to download map data for the at least one preset map from the user computing device; and sending, by the map service, the map data for the at least one preset map to the user computing device.

The data defining the relevant location can comprise current location data of the user computing device, past location data of the user computing device, or a combination thereof.

The data describing the at least one preset map can be associated with a predefined set of map data; and the request to download map data for the at least one preset map can comprise a modification to the predefined set of map data.

The data defining the relevant location can comprise a user search query entered through at least one application, message data received by the at least one application, calendar data generated by the at least one application, content data presented by the at least one application, or a combination thereof.

Each of the plurality of preset maps may not be defined by extending a radius from a point of interest and generating a boundary defined by the radius.

The at least one preset map can comprise a plurality of preset maps.

The sending the data describing the at least one preset map can comprise ranking the plurality of preset maps in order of relevance to the current location data, past location data, or combination thereof.

Each of the plurality of preset maps can be defined to include a same geographic or political area unit at respective different resolutions.

The geographic or political area units can include at least one neighborhood, at least one municipality, at least one county, at least one state, at least one region, at least one country, or a combination thereof.

A method can comprise: collecting, by a data collection module of a computing device, location information defining at least one relevant location, the collecting comprising identifying a current location of the computing device and past locations of the computing device and identifying at least one of the current and past locations as the at least one relevant location; sending, by an offline map module of the computing device, data describing the at least one relevant location to a server computing device; receiving, by the offline map module from the server computing device, data describing at least one preset map containing the at least one relevant location, wherein the at least one preset map is defined to include at least one geographic or political area unit; receiving, by a user interface of the computing device, a user request to download the at least one preset map; and requesting, by the offline map module, the at least one preset map from the server computing device.

The method can further comprise generating, by the offline map module, the data describing the at least one relevant location by approximating coordinates of the at least one relevant location.

The approximating can comprise truncating or rounding the coordinates.

The method can further comprise: receiving, by the user interface, a user search query; and prior to the sending, adding, by the offline map module, the user search query to the data describing the at least one relevant location, wherein the at least one preset map is responsive to the user search query.

The method can further comprise: determining, by the offline map module, whether the user device is connected to a power source and a WiFi network, wherein the requesting is performed in response to determining that the user device is connected to the power source and the WiFi network.

The method can further comprise: determining, by the offline map module, whether the user device is connected to a power source and a WiFi network; and in response to determining that the user device is not connected to the power source and the WiFi network, presenting, by the user interface, an override option, wherein the requesting is performed in response to receiving an override command by the user interface.

The method can further comprise: receiving, by the user interface, a command to delete the at least one preset map from a memory of the user device; and deleting, by the offline map module, the at least one preset map from the memory.

The method can further comprise: presenting, by the user interface, at least one settings option related to management of the at least one preset map stored in a memory of the user device; and performing, by the offline map module, at least one settings process in response to receiving a command by the user interface.

The at least one settings process can comrpise editing an area of the at least one preset map, downloading the at least one preset map, renaming the at least one preset map, deleting the at least one preset map, or a combination thereof.

The at least one preset map can comrpise a plurality of preset maps.

Each of the plurality of preset maps can be defined to include a same geographic or political area unit at respective different resolutions.

The geographic or political area units can include at least one neighborhood, at least one municipality, at least one county, at least one state, at least one region, at least one country, or a combination thereof.

A non-transitory computer-readable medium can include one or more sequences of instructions that, when executed by one or more processors, cause the processors to perform operations comprising: receiving data defining a relevant location from a user computing device, the data predicting the computing device will be located in the relevant location at a future time; identifying at least one preset map from a plurality of preset maps that corresponds to the relevant location, wherein each of the plurality of preset maps is defined to include a respective geographic or political area unit; sending data describing the at least one preset map to the user computing device; receiving, from the user computing device, a request to download map data for the at least one preset map from the user computing device; and sending the map data for the at least one preset map to the user computing device.

The data defining the relevant location can comprise current location data of the user computing device, past location data of the user computing device, or a combination thereof.

The data describing the at least one preset map can be associated with a predefined set of map data; and the request to download map data for the at least one preset map can comprise a modification to the predefined set of map data.

The data defining the relevant location can further comprise a user search query entered through at least one application, message data received by the at least one application, calendar data generated by the at least one application, content data presented by the at least one application, or a combination thereof.

Each of the plurality of preset maps may not be defined by extending a radius from a point of interest and generating a boundary defined by the radius.

The at least one preset map can comprise a plurality of preset maps.

The sending the data describing the at least one preset map can comprise ranking the plurality of preset maps in order of relevance to the current location data, past location data, or combination thereof.

Each of the plurality of preset maps can be defined to include a same geographic or political area unit at respective different resolutions.

The geographic or political area units can include at least one neighborhood, at least one municipality, at least one county, at least one state, at least one region, at least one country, or a combination thereof.

A non-transitory computer-readable medium can include one or more sequences of instructions that, when executed by one or more processors, cause the processors to perform operations comprising: collecting location information defining at least one relevant location, the collecting comprising identifying a current location of the computing device and past locations of the computing device and identifying at least one of the current and past locations as the at least one relevant location; sending data describing the at least one relevant location to a server computing device; receiving, from the server computing device, data describing at least one preset map containing the at least one relevant location, wherein the at least one preset map is defined to include at least one geographic or political area unit; receiving a user request to download the at least one preset map; and requesting the at least one preset map from the server computing device.

The instructions, when executed by the one or more processors, can further cause the processors to perform operations comprising generating the data describing the at least one relevant location by approximating coordinates of the at least one relevant location.

The approximating can comprise truncating or rounding the coordinates.

The instructions, when executed by the one or more processors, can further cause the processors to perform operations comprising: receiving a user search query; and prior to the sending, adding the user search query to the data describing the at least one relevant location, wherein the at least one preset map is responsive to the user search query.

The instructions, when executed by the one or more processors, can further cause the processors to perform operations comprising: determining whether the user device is connected to a power source and a WiFi network, wherein the requesting is performed in response to determining that the user device is connected to the power source and the WiFi network.

The instructions, when executed by the one or more processors, can further cause the processors to perform operations comprising: determining whether the user device is connected to a power source and a WiFi network; and in response to determining that the user device is not connected to the power source and the WiFi network, presenting an override option, wherein the requesting is performed in response to receiving an override command by the user interface.

The instructions, when executed by the one or more processors, can further cause the processors to perform operations comprising: receiving a command to delete the at least one preset map from a memory of the user device; and deleting the at least one preset map from the memory.

The instructions, when executed by the one or more processors, can further cause the processors to perform operations comprising: presenting, by the user interface, at least one settings option related to management of the at least one preset map stored in a memory of the user device; and performing, by the offline map module, at least one settings process in response to receiving a command by the user interface.

The at least one settings process can comprise editing an area of the at least one preset map, downloading the at least one preset map, renaming the at least one preset map, deleting the at least one preset map, or a combination thereof.

The at least one preset map can comprise a plurality of preset maps.

Each of the plurality of preset maps can be defined to include a same geographic or political area unit at respective different resolutions.

The geographic or political area units can include at least one neighborhood, at least one municipality, at least one county, at least one state, at least one region, at least one country, or a combination thereof.

A system can comprise: one or more processors; and a non-transitory computer-readable medium including one or more sequences of instructions that, when executed by the one or more processors, cause the processors to perform operations comprising: receiving data defining a relevant location from a user computing device, the data predicting the computing device will be located in the relevant location at a future time; identifying at least one preset map from a plurality of preset maps that corresponds to the relevant location, wherein each of the plurality of preset maps is defined to include a respective geographic or political area unit; sending data describing the at least one preset map to the user computing device; receiving, from the user computing device, a request to download map data for the at least one preset map from the user computing device; and sending the map data for the at least one preset map to the user computing device.

The data defining the relevant location can comprise current location data of the user computing device, past location data of the user computing device, or a combination thereof.

The data describing the at least one preset map can be associated with a predefined set of map data; and the request to download map data for the at least one preset map can comprise a modification to the predefined set of map data.

The data defining the relevant location can further comprise a user search query entered through at least one application, message data received by the at least one application, calendar data generated by the at least one application, content data presented by the at least one application, or a combination thereof.

Each of the plurality of preset maps may not be defined by extending a radius from a point of interest and generating a boundary defined by the radius.

The at least one preset map can comprise a plurality of preset maps.

The sending the data describing the at least one preset map can comprise ranking the plurality of preset maps in order of relevance to the current location data, past location data, or combination thereof.

Each of the plurality of preset maps can be defined to include a same geographic or political area unit at respective different resolutions.

The geographic or political area units can include at least one neighborhood, at least one municipality, at least one county, at least one state, at least one region, at least one country, or a combination thereof.

A system can comprise: one or more processors; and a non-transitory computer-readable medium including one or more sequences of instructions that, when executed by the one or more processors, cause the processors to perform operations comprising: collecting location information defining at least one relevant location, the collecting comprising identifying a current location of the computing device and past locations of the computing device and identifying at least one of the current and past locations as the at least one relevant location; sending data describing the at least one relevant location to a server computing device; receiving, from the server computing device, data describing at least one preset map containing the at least one relevant location, wherein the at least one preset map is defined to include at least one geographic or political area unit; receiving a user request to download the at least one preset map; and requesting the at least one preset map from the server computing device.

The instructions, when executed by the one or more processors, can further cause the processors to perform operations comprising generating the data describing the at least one relevant location by approximating coordinates of the at least one relevant location.

The approximating can comprise truncating or rounding the coordinates.

The instructions, when executed by the one or more processors, can further cause the processors to perform operations comprising: receiving a user search query; and prior to the sending, adding the user search query to the data describing the at least one relevant location, wherein the at least one preset map is responsive to the user search query.

The instructions, when executed by the one or more processors, can further cause the processors to perform operations comprising: determining whether the user device is connected to a power source and a WiFi network, wherein the requesting is performed in response to determining that the user device is connected to the power source and the WiFi network.

The instructions, when executed by the one or more processors, can further cause the processors to perform operations comprising: determining whether the user device is connected to a power source and a WiFi network; and in response to determining that the user device is not connected to the power source and the WiFi network, presenting an override option, wherein the requesting is performed in response to receiving an override command by the user interface.

The instructions, when executed by the one or more processors, can further cause the processors to perform operations comprising: receiving a command to delete the at least one preset map from a memory of the user device; and deleting the at least one preset map from the memory.

The instructions, when executed by the one or more processors, can further cause the processors to perform operations comprising: presenting, by the user interface, at least one settings option related to management of the at least one preset map stored in a memory of the user device; and performing, by the offline map module, at least one settings process in response to receiving a command by the user interface.

The at least one settings process can comprise editing an area of the at least one preset map, downloading the at least one preset map, renaming the at least one preset map, deleting the at least one preset map, or a combination thereof.

The at least one preset map can comprise a plurality of preset maps.

Each of the plurality of preset maps can be defined to include a same geographic or political area unit at respective different resolutions.

The geographic or political area units can include at least one neighborhood, at least one municipality, at least one county, at least one state, at least one region, at least one country, or a combination thereof.

A method can comprise: receiving, by a map service of a computing device, data defining a relevant location from a user computing device; defining, by the map service, a polygon containing the relevant location; expanding, by the map service, the polygon by a predefined distance on all sides of the polygon to form an offline map area; sending, by the map service, data describing the offline map area to the user computing device; receiving, by the map service from the user computing device, a request to download map data contained within the offline map area; and sending, by the map service, the map data to the user computing device.

The data defining the relevant location can comprise coordinates; and defining the polygon can comprise fitting the coordinates to a data structure defining a plurality of predefined sections of the map data.

The data structure can comprise a quadtree; and the predefined sections can be nodes of the quadtree.

The data describing the offline map area can comprise at least one coordinate for the polygon.

The polygon can be a square; and the at least one coordinate can comprise a first corner coordinate of the square and a second corner coordinate of the square opposite the first corner coordinate.

The method can further comprise enhancing, by the map service, the offline map area with additional map area outside the offline map area formed by expanding the polygon.

The enhancing can comprise further expanding the polygon.

The enhancing can comprise determining that the additional map area is related to at least a portion of the offline map area.

A method can comprise: collecting, by a data collection module of a computing device, location information defining at least one relevant location, the collecting comprising identifying a current location of the computing device and past locations of the computing device and identifying at least one of the current and past locations as the at least one relevant location; sending, by an offline map module of the computing device, data describing the at least one relevant location to a server computing device; receiving, by the offline map module from the server computing device, data describing an offline map area containing the at least one relevant location; identifying, by the offline map module, map data contained within the offline map area that is present within a map data database of the computing device; determining, by the offline map module, needed map data based on the identifying; and requesting, by the offline map module, the needed map data from the server computing device.

The sending can be performed automatically without a user request.

The method can further comprise generating, by the offline map module, the data describing the at least one relevant location by approximating coordinates of the at least one relevant location.

The approximating can comprise truncating or rounding the coordinates.

The method can further comprise: determining, by the offline map module, that at least a portion of the map data contained within the map data database is out of date; and requesting, by the offline map module, an update to the out of date map data from the server computing device.

A non-transitory computer-readable medium can include one or more sequences of instructions that, when executed by one or more processors, cause the processors to perform operations comprising: receiving data defining a relevant location from a user computing device; defining a polygon containing the relevant location; expanding the polygon by a predefined distance on all sides of the polygon to form an offline map area; sending data describing the offline map area to the user computing device; receiving a request from the user computing device to download map data contained within the offline map area; and sending the map data to the user computing device.

The data defining the relevant location can comprise coordinates; and defining the polygon can comprise fitting the coordinates to a data structure defining a plurality of predefined sections of the map data.

The data structure can comprise a quadtree; and the predefined sections can be nodes of the quadtree.

The data describing the offline map area can comprise at least one coordinate for the polygon.

The polygon can be a square; and the at least one coordinate can comprise a first corner coordinate of the square and a second corner coordinate of the square opposite the first corner coordinate.

The instructions, when executed by the one or more processors, can further cause the processors to perform operations comprising enhancing the offline map area with additional map area outside the offline map area formed by expanding the polygon.

The enhancing can comprise further expanding the polygon.

The enhancing can comprise determining that the additional map area is related to at least a portion of the offline map area.

A non-transitory computer-readable medium can include one or more sequences of instructions that, when executed by one or more processors, cause the processors to perform operations comprising: collecting location information defining at least one relevant location, the collecting comprising identifying a current location of the computing device and past locations of the computing device and identifying at least one of the current and past locations as the at least one relevant location; sending data describing the at least one relevant location to a server computing device; receiving, from the server computing device, data describing an offline map area containing the at least one relevant location; identifying map data contained within the offline map area that is present within a map data database of the computing device; determining needed map data based on the identifying; and requesting the needed map data from the server computing device.

The sending can be performed automatically without a user request.

The instructions, when executed by the one or more processors, can further cause the processors to perform operations comprising generating the data describing the at least one relevant location by approximating coordinates of the at least one relevant location.

The approximating can comprise truncating or rounding the coordinates.

The instructions, when executed by the one or more processors, can further cause the processors to perform operations comprising: determining that at least a portion of the map data contained within the map data database is out of date; and requesting an update to the out of date map data from the server computing device.

A system can comprise: one or more processors; and a non-transitory computer-readable medium including one or more sequences of instructions that, when executed by the one or more processors, cause the processors to perform operations comprising: receiving data defining a relevant location from a user computing device; defining a polygon containing the relevant location; expanding the polygon by a predefined distance on all sides of the polygon to form an offline map area; sending data describing the offline map area to the user computing device; receiving a request from the user computing device to download map data contained within the offline map area; and sending the map data to the user computing device.

The data defining the relevant location can comprise coordinates; and defining the polygon can comprise fitting the coordinates to a data structure defining a plurality of predefined sections of the map data.

The data structure can comprise a quadtree; and the predefined sections can be nodes of the quadtree.

The data describing the offline map area can comprise at least one coordinate for the polygon.

The polygon can be a square; and the at least one coordinate can comprise a first corner coordinate of the square and a second corner coordinate of the square opposite the first corner coordinate.

The instructions, when executed by the one or more processors, can further cause the processors to perform operations comprising enhancing the offline map area with additional map area outside the offline map area formed by expanding the polygon.

The enhancing can comprise further expanding the polygon.

The enhancing can comprise determining that the additional map area is related to at least a portion of the offline map area.

A system can comprise: one or more processors; and a non-transitory computer-readable medium including one or more sequences of instructions that, when executed by the one or more processors, cause the processors to perform operations comprising: collecting location information defining at least one relevant location, the collecting comprising identifying a current location of the computing device and past locations of the computing device and identifying at least one of the current and past locations as the at least one relevant location; sending data describing the at least one relevant location to a server computing device; receiving, from the server computing device, data describing an offline map area containing the at least one relevant location; identifying map data contained within the offline map area that is present within a map data database of the computing device; determining needed map data based on the identifying; and requesting the needed map data from the server computing device.

The sending can be performed automatically without a user request.

The instructions, when executed by the one or more processors, can further cause the processors to perform operations comprising generating the data describing the at least one relevant location by approximating coordinates of the at least one relevant location.

The approximating can comprise truncating or rounding the coordinates.

The instructions, when executed by the one or more processors, can further cause the processors to perform operations comprising: determining that at least a portion of the map data contained within the map data database is out of date; and requesting an update to the out of date map data from the server computing device.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by a map service of a computing device, data defining a relevant location from a user computing device;
   generating, by the map service, an offline map area definition containing the relevant location, the offline map area definition being represented by a polygon with each side of the polygon being a predetermined distance from the relevant location;
   sending, by the map service, the offline map area definition to the user computing device;
   receiving, by the map service from the user computing device, a request for an offline map that includes an offline map area corresponding to the offline map area definition; and
   sending, by the map service, the offline map based on the offline map area definition to the user computing device.

2. The method of claim 1, wherein:
   the data defining the relevant location includes an approximation of the relevant location and comprises coordinates of an approximate area surrounding the relevant location; and
   defining the offline map area comprises fitting the coordinates to a data structure defining a plurality of predefined sections of the offline map area.

3. The method of claim 2, wherein:
the data structure comprises a quadtree; and
the predefined sections are nodes of the quadtree.

4. The method of claim 1, wherein the offline map area definition comprises at least one coordinate for the polygon.

5. The method of claim 4, wherein: the polygon is a square; and
the at least one coordinate comprises a first corner coordinate of the square and a second corner coordinate of the square opposite the first corner coordinate.

6. The method of claim 1, further comprising enhancing, by the map service, the offline map area with additional map area outside the offline map area formed by expanding the polygon.

7. The method of claim 6, wherein the enhancing comprises further expanding the polygon.

8. The method of claim 6, wherein the enhancing comprises determining that the additional map area is related to at least a portion of the offline map area.

9. A non-transitory computer-readable medium including one or more sequences of instructions that, when executed by one or more processors, cause the processors to perform operations comprising:
receiving, by a map service of a computing device, data defining a relevant location from a user computing device;
generating, by the map service, an offline map area definition containing the relevant location, the offline map area definition being represented by a polygon with each side of the polygon being a predetermined distance from the relevant location;
sending, by the map service, the offline map area definition to the user computing device;
receiving, by the map service from the user computing device, a request for an offline map that includes an offline map area corresponding to the offline map area definition; and
sending, by the map service, the offline map based on the offline map area definition to the user computing device.

10. The non-transitory computer-readable medium of claim 9, wherein:
the data defining the relevant location includes an approximation of the relevant location and comprises coordinates of an approximate area surrounding the relevant location; and
defining the offline map area comprises fitting the coordinates to a data structure defining a plurality of predefined sections of the offline map area.

11. The non-transitory computer-readable medium of claim 10, wherein:
the data structure comprises a quadtree; and
the predefined sections are nodes of the quadtree.

12. The non-transitory computer-readable medium of claim 9, wherein the offline map area definition comprises at least one coordinate for the polygon.

13. The non-transitory computer-readable medium of claim 12, wherein: the polygon is a square; and
the at least one coordinate comprises a first corner coordinate of the square and a second corner coordinate of the square opposite the first corner coordinate.

14. The non-transitory computer-readable medium of claim 9, wherein the instructions, when executed by the one or more processors, further cause the processors to perform operations comprising enhancing the offline map area with additional map area outside the offline map area formed by expanding the polygon.

15. The non-transitory computer-readable medium of claim 14, wherein the enhancing comprises further expanding the polygon.

16. The non-transitory computer-readable medium of claim 14, wherein the enhancing comprises determining that the additional map area is related to at least a portion of the offline map area.

17. A system comprising:
one or more processors; and
a non-transitory computer-readable medium including one or more sequences of instructions that, when executed by the one or more processors, cause the processors to perform operations comprising:
receiving, by a map service of a computing device, data defining a relevant location from a user computing device;
generating, by the map service, an offline map area definition containing the relevant location, the offline map area definition being represented by a polygon with each side of the polygon being a predetermined distance from the relevant location;
sending, by the map service, the offline map area definition to the user computing device;
receiving, by the map service from the user computing device, a request for an offline map that includes an offline map area corresponding to the offline map area definition; and
sending, by the map service, the offline map based on the offline map area definition to the user computing device.

18. The system of claim 17, wherein:
the data defining the relevant location includes an approximation of the relevant location and comprises coordinates of an approximate area surrounding the relevant location; and
defining the offline map area comprises fitting the coordinates to a data structure defining a plurality of predefined sections of the offline map area.

19. The system of claim 18, wherein:
the data structure comprises a quadtree; and
the predefined sections are nodes of the quadtree.

20. The system of claim 17, wherein the offline map area definition comprises at least one coordinate for the polygon.

21. The system of claim 20, wherein: the polygon is a square; and
the at least one coordinate comprises a first corner coordinate of the square and a second corner coordinate of the square opposite the first corner coordinate.

22. The system of claim 17, wherein the instructions, when executed by the one or more processors, further cause the processors to perform operations comprising enhancing the offline map area with additional map area outside the offline map area formed by expanding the polygon.

23. The system of claim 22, wherein the enhancing comprises further expanding the polygon.

24. The system of claim 22, wherein the enhancing comprises determining that the additional map area is related to at least a portion of the offline map area.

* * * * *

UNITED STATES PATENT AND TRADEMARK OFFICE
CERTIFICATE OF CORRECTION

PATENT NO. : 10,433,108 B2  
APPLICATION NO. : 15/990412  
DATED : October 1, 2019  
INVENTOR(S) : Matthew B. Ball et al.

Page 1 of 1

It is certified that error appears in the above-identified patent and that said Letters Patent is hereby corrected as shown below:

On the Title Page

Item (63), "Continuation of Application No.62/514,573, filed on Jun. 2, 2017." should be changed to --Claims the benefit of Application No. 62/514,573, filed on Jun. 2, 2017.--

Signed and Sealed this  
Third Day of December, 2019

Andrei Iancu  
*Director of the United States Patent and Trademark Office*